ized Handbook Optical Design"
United States Patent
Kuo et al.

(10) Patent No.: US 12,025,800 B2
(45) Date of Patent: Jul. 2, 2024

(54) OPTICAL LENS

(71) Applicant: Coretronic Corporation, Hsin-Chu (TW)

(72) Inventors: Tao-Hung Kuo, Hsin-Chu (TW); Fu-Ming Chuang, Hsin-Chu (TW); Po-Che Lee, Hsin-Chu (TW); Hsin-Wen Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 273 days.

(21) Appl. No.: 17/164,848

(22) Filed: Feb. 2, 2021

(65) Prior Publication Data
US 2021/0271055 A1 Sep. 2, 2021

(30) Foreign Application Priority Data
Feb. 27, 2020 (CN) .......................... 202010122428.9

(51) Int. Cl.
| | | |
|---|---|---|
| *G02B 27/01* | (2006.01) | |
| *G02B 9/60* | (2006.01) | |
| *G02B 13/00* | (2006.01) | |
| *G02B 13/16* | (2006.01) | |

(52) U.S. Cl.
CPC ........... *G02B 27/0172* (2013.01); *G02B 9/60* (2013.01); *G02B 13/0045* (2013.01); *G02B 13/16* (2013.01); *G02B 2027/0123* (2013.01)

(58) Field of Classification Search
CPC .. G02B 27/0172; G02B 9/60; G02B 13/0045; G02B 13/16; G02B 2027/0123
See application file for complete search history.

(56) References Cited

U.S. PATENT DOCUMENTS

| 3,920,315 | A | * | 11/1975 | Linke | ..................... G02B 13/18 |
|---|---|---|---|---|---|
| | | | | | 359/686 |
| 4,105,308 | A | * | 8/1978 | Owen, Jr. | ................ G02B 9/14 |
| | | | | | 359/716 |
| 8,587,869 | B2 | | 11/2013 | Totani et al. | |
| 2003/0165019 | A1 | * | 9/2003 | Yamamoto | ..... G02B 15/145523 |
| | | | | | 359/683 |

(Continued)

FOREIGN PATENT DOCUMENTS

| CN | 1432859 | 7/2003 |
|---|---|---|
| CN | 103765292 | 4/2014 |

(Continued)

OTHER PUBLICATIONS

MIL-HDBK-141 "Military Standardization Handbook Optical Design" p. 8-15 (Year: 1962).*

(Continued)

*Primary Examiner* — George G. King
(74) *Attorney, Agent, or Firm* — JCIPRNET

(57) ABSTRACT

An optical lens is provided. The optical lens includes a first lens element to a fifth lens element sequentially arranged from a light incident side to a light exit side. An image generation device is disposed at the light incident side, and the optical lens is configured to receive an image beam provided by the image generation device. The image beam forms a stop at the light exit side. The stop has a minimum cross-sectional area of beam shrinkage of the image beam. The optical lens provided by the invention exhibits good optical quality and thermal stability.

16 Claims, 26 Drawing Sheets

(56) References Cited

U.S. PATENT DOCUMENTS

| | | | |
|---|---|---|---|
| 2012/0026606 | A1 | 2/2012 | Lee et al. |
| 2019/0025558 | A1* | 1/2019 | Chen ............... G02B 13/0045 |
| 2019/0137734 | A1 | 5/2019 | Gong et al. |
| 2019/0155027 | A1* | 5/2019 | Marshall ............ G02B 6/0076 |
| 2019/0187353 | A1 | 6/2019 | Kuo et al. |
| 2020/0057308 | A1* | 2/2020 | Choi ............... G02B 27/0101 |
| 2021/0356731 | A1* | 11/2021 | Mogi ..................... G02B 9/60 |

FOREIGN PATENT DOCUMENTS

| | | |
|---|---|---|
| CN | 103837971 | 6/2014 |
| CN | 104793319 | 7/2015 |
| CN | 106873140 | 6/2017 |
| CN | 109283668 | 1/2019 |
| CN | 109932806 | 6/2019 |
| CN | 109932820 | 6/2019 |
| CN | 209746251 | 12/2019 |
| EP | 2749929 | 7/2014 |
| JP | H07234361 | 9/1995 |
| JP | H0829704 | 2/1996 |
| JP | H10197790 | 7/1998 |
| JP | 2001124990 | 5/2001 |
| JP | 2012008489 | 1/2012 |
| JP | 2013045020 | 3/2013 |
| JP | 2013088632 | 5/2013 |
| JP | 2017122771 | 7/2017 |
| JP | 2017219785 | 12/2017 |
| JP | 2018028632 | 2/2018 |
| JP | 2019109496 | 7/2019 |
| TW | 201321793 | 6/2013 |
| TW | 201908800 | 3/2019 |
| TW | 201928423 | 7/2019 |
| TW | 201928435 | 7/2019 |
| TW | I664469 | 7/2019 |
| WO | 2019054359 | 3/2019 |
| WO | 2019210740 | 11/2019 |
| WO | WO-2020166390 A1 * | 8/2020 ............ G02B 13/18 |

OTHER PUBLICATIONS

Herbert Gross et al., "Handbook of optical systems : vol. 3: Aberration theory and correction of optical systems," Jan. 1, 2007, Wiley-VCH, Weinheim, Germany, pp. 1-34.

Herbert Gross et al., "Handbook of optical systems : vol. 3: Aberration theory and correction of optical systems," Jan. 1, 2007, Wiley-VCH, Weinheim, Germany, pp. 1-5.

"Search Report of Europe Counterpart Application", issued on Jun. 30, 2021, p. 1-p. 9.

"Office Action of China Counterpart Application", issued on Jan. 18, 2023, p. 1-p. 8.

"Office Action of China Counterpart Application", issued on Dec. 14, 2023, p. 1-p. 4.

* cited by examiner

OPTICAL LENS

CROSS-REFERENCE TO RELATED APPLICATION

This application claims the priority benefit of China application serial no. 202010122428.9, filed on Feb. 27, 2020. The entirety of the above-mentioned patent application is hereby incorporated by reference herein and made a part of this specification.

BACKGROUND

Technical Field

The invention relates to an optical lens, and in particular, to an optical lens for a waveguide display.

Description of Related Art

Displays with waveguides (waveguide displays) may be divided into a self-luminous panel framework, a transmissive panel framework, and a reflective panel framework according to types of image sources thereof. In a waveguide display of the self-luminous or transmissive panel framework, an image beam provided by any one of the above panels passes through an optical lens and enters a waveguide through a coupling entrance. Next, the image beam is transmitted to a coupling exit in the waveguide, and then the image beam is projected to a position of a human eye to form an image. Herein, in a waveguide display of the reflective panel framework, after an illumination light beam provided by a light source is transmitted by an illumination optical device, the illumination light beam irradiates a reflective panel through an illumination prism. The reflective panel converts the illumination light beam into an image beam, the reflective panel transmits the image beam to an optical lens, and the image beam is guided into a waveguide through the optical lens. Next, the image beam is transmitted to a coupling exit in the waveguide, and then the image beam is projected to the position of the human eye. An image generated by an image source (the panel) may be processed by the optical lens to form a virtual image at a certain distance, and the virtual image is imaged on a retina through the human eye. Optical lenses are used in waveguide displays, and design of sizes, weights, and thermal stability of the optical lenses are important issues to be considered.

The information disclosed in this BACKGROUND section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an optical lens featuring good optical quality and thermal stability.

Other objects and advantages of the invention can be further illustrated by the technical features broadly embodied and described as follows.

In order to achieve one or a part of or all of the above advantages or other advantages, an embodiment of the invention provides an optical lens including a first lens element, a second lens element, a third lens element, a fourth lens element, and a fifth lens element sequentially arranged from a light incident side to a light exit side. Refracting powers of the first lens element to the fourth lens element sequentially are positive, negative, positive, and positive, and the fifth lens element has refracting power. An image generation device is disposed at the light incident side. The optical lens is configured to receive an image beam provided by the image generation device. The image beam forms a beam waist at the light exit side. The beam waist has a minimum cross-sectional area of beam shrinkage of the image beam.

To sum up, the embodiments of the invention have at least one of the following advantages or effects. In the exemplary embodiments of the invention, since the optical lens is designed to satisfy the above refracting power combination and the arrangement manner and number of the lens elements, the optical lens may feature good imaging quality with a short total lens length.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
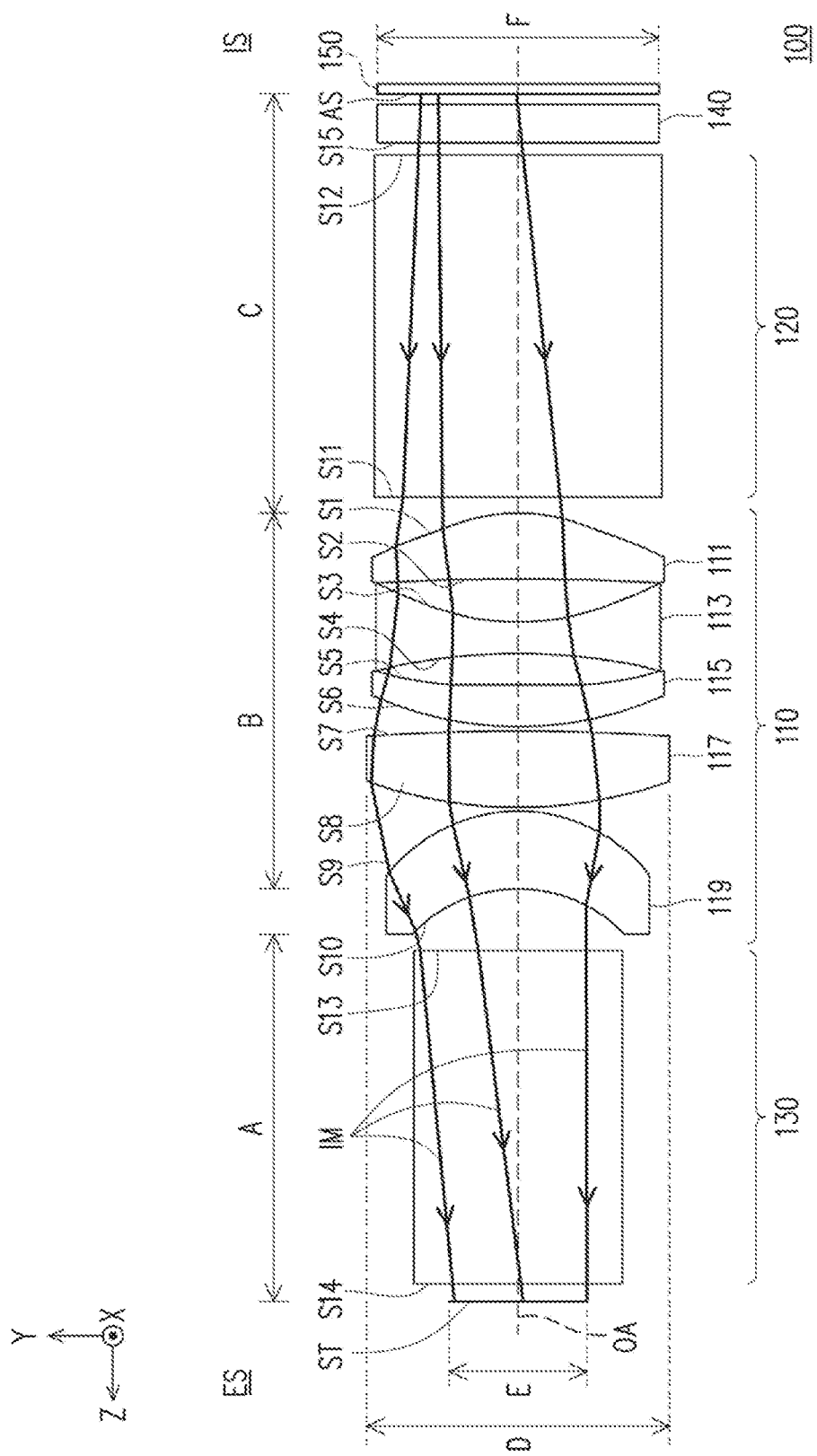
FIG. 1 is a schematic diagram of a waveguide display according to an embodiment of the invention.

FIG. 1 is a schematic diagram of a waveguide display according to an embodiment of the invention.

With reference to FIG. 1, a waveguide display 100 of this embodiment is applied to a head-mounted display apparatus having a waveguide device 130, but the invention is not limited thereto. In this embodiment, the waveguide display 100 includes an optical lens 110, an illumination prism (a second prism) 120, a waveguide device 130, a gloss cover 140, and an image generation device 150. The image generation device 150 is disposed at a light incident side IS relative to the optical lens 110. The image generation device 150 may be a display apparatus configured for providing an image beam IM, or the image generation device 150 is a display device configured for producing an image such as a digital micromirror device (DMD) or a reflective liquid crystal on silicon (LCoS) display. In other embodiments, the image generation device 150 may be a transmissive spatial light modulator, such as a transparent liquid crystal panel, etc., and forms and types of the image generation device 150 are not limited by the invention. The illumination prism 120 is disposed between the optical lens 110 and the image generation device 150. The image beam IM provided by the image generation device 150 passes through the illumination prism 120 and enters the optical lens 110. The optical lens 110 is suitable for receiving the image beam IM. In this embodiment, the glass cover 140 is disposed between the image generation device 150 and the illumination prism 120, so that the image generation device 150 is prevented from being affected by dust.

In this embodiment, the image beam IM forms a beam waist ST at a light exit side ES of the optical lens 110 after passing through the optical lens 110. The beam waist ST has a minimum cross-sectional area of beam shrinkage of the image beam IM. For example, in the embodiment, the beam waist ST is, for example, a circle on a reference plane formed by an X-axis and a Y-axis, and diameters of the beam waist ST in the X-axis direction and in the Y-axis direction are the same. In the embodiment, the image beam IM forms the beam waist ST after passing through the optical lens 110. The beam waist ST has the minimum cross-sectional area of the beam shrinkage of the image beam IM. Therefore, the image beam IM is converged to the beam waist ST after passing through the optical lens 110 and is diverged after passing through the beam waist ST. In the embodiment, a position of the image beam IM after passing through the optical lens 110 at the beam waist ST is, for example, inside the waveguide device. FIG. 1 is an example of an equivalent optical path, and only a portion of the waveguide device 130 located within the beam waist ST is depicted. The image beam IM enters the waveguide device 130 and passes through the beam waist ST, is transmitted in the waveguide device 130, and is then projected to a predetermined target. In an embodiment, the predetermined target (not shown) is, for example, a human eye.

In detail, in the embodiment, the optical lens 110 includes a first lens element 111, a second lens element 113, a third lens element 115, a fourth lens element 117, and a fifth lens element 119 sequentially arranged from the light incident side IS to the light exit side ES, and refracting powers of the lens elements sequentially are positive, negative, positive, positive, and positive. In this embodiment, the first lens element 111 is a concave-convex lens element and has concave surface facing the light exit side ES and a convex surface facing the light incident side IS. The second lens element 113 is a biconcave lens element and has concave surfaces respectively facing the light exit side ES and the light incident side IS. The third lens element 115 is a concave-convex lens element and has a convex surface facing the light exit side ES and a concave surface facing the light incident side IS. The fourth lens element 117 is a biconvex lens element and has convex surfaces respectively facing the light exit side ES and the light incident side IS, and an equivalent focal length of the fourth lens element 117 is greater than 0. The fifth lens element 119 is a concave-convex lens element and has a concave surface facing the light exit side ES and a convex surface facing the light incident side IS. In this embodiment, the first, second, third, and fifth lens elements 111, 113, 115, and 119 are plastic aspheric lens elements, and the fourth lens element 117 is a glass spherical lens element.

An example of the optical lens 110 applied to the waveguide display 100 is provided as follows. Note that the invention is not limited to the data listed as follows. It should be known to a person of ordinary skill in the art that various modifications and variations can be made to the parameters or configurations of the invention with reference to the invention, and such modifications and variations still belong to the scope of the invention.

TABLE ONE

| Device | Surface | Radius of Curvature (mm) | Gap (mm) | Index of Refraction | Abbe Number | Optical Effective Radius (mm) |
|---|---|---|---|---|---|---|
| Object | | infinity | | | | |
| Stop ST | | infinity | 0.5 | | | 2 |
| Waveguide Device 130 | S14 | infinity | 9.5 | 1.83 | 42.7 | 2.1 |
| | S13 | infinity | 1.77 | | | 2.9 |
| Fifth Lens Element 119 | S10 | −4.00 | 2.25 | 1.53 | 55.7 | 3.0 |
| | S9 | −4.46 | 0.10 | | | 3.8 |
| Fourth Lens Element 117 | S8 | 13.23 | 2.19 | 1.79 | 44.2 | 4.3 |
| | S7 | −52.39 | 0.1 | | | 4.3 |
| Third Lens Element 115 | S6 | 8.52 | 1.22 | 1.53 | 55.7 | 4.2 |
| | S5 | 508.61 | 0.84 | | | 4.1 |
| Second Lens Element 113 | S4 | −17.96 | 0.95 | 1.63 | 23.3 | 4.1 |
| | S3 | 5.26 | 1.24 | | | 4.0 |
| First Lens Element 111 | S2 | −17.84 | 1.83 | 1.53 | 55.7 | 4.0 |
| | S1 | −5.36 | 0.5 | | | 4.1 |
| Illumination Prism 120 | S11 | infinity | 9.8 | 1.83 | 42.7 | 4.1 |
| | S12 | infinity | 0.3 | | | 4.0 |
| Glass Cover 140 | S15 | | | | | |

With reference to FIG. 1 and Table One, surfaces and related parameters of various devices in the waveguide display 100 are listed in Table One. The surface S1 is the surface of the first lens element 111 facing the light incident side IS, and the surface S2 is the surface of the first lens element 111 facing the light exit side ES, and the rest may be deduced by analogy. Besides, the gap refers to a straight-line distance between any two adjacent surfaces on an optical axis OA. For instance, the gap corresponding to the surface S2 is 1.83 mm, this means that the straight line distance from the surface S1 to the surface S2 on the optical axis OA is 1.83 millimeters (i.e., a thickness of the first lens element), and the gap corresponding to the surface S3 is 1.24 mm, this means that the straight line distance from the surface S2 to the surface S3 on the optical axis OA is 1.24 millimeters, and the rest may be deduced by analogy. The optical effective radius refers to a half of a maximum diameter of a device through which light passes.

In this embodiment, the first, second, third, and fifth lens elements 111, 113, 115, and 119 are all aspheric lens elements, and a formula of an aspheric lens element is as follows:

$$X = \frac{Y^2}{R\left(1 + \sqrt{1-(1+k)*Y^2/R^2}\right)} + A_2Y^2 + A_4Y^4 + A_6Y^6 + A_8Y^8 + A_{10}Y^{10} + A_{12}Y^{12}$$

In the above formula, X is a sag in a direction of the optical axis OA, and R is a radius of an osculating sphere, i.e., a radius of curvature (the radius of curvature as listed in Table One) near the optical axis OA. k is a conic coefficient, Y is an aspheric height, i.e., the height from the center to the edge of the lens, and A2, A4, A6, A8, $A_{10}$, and $A_{11}$ are aspheric coefficients. In this embodiment, the coefficient $A_2$ is 0, and data of $A_2$ is omitted herein. Parameters of the above aspheric lens elements are listed in the following Table Two, and E-003 represents 10 to the minus 3 power, and the rest may be deduced by analogy.

TABLE TWO

| Surface | K | A4 | A6 |
|---|---|---|---|
| S10 | 2.33E−001 | 1.33E−003 | −5.93E−005 |
| S9 | 0 | −8.28E−005 | 2.93E−005 |
| S6 | 0 | −1.21E−003 | 4.82E−005 |
| S5 | 0 | 2.55E−003 | −1.35E−004 |
| S4 | 2.90 | −5.66E−006 | 7.37E−005 |
| S3 | −5.41 | −5.72E−004 | 4.35E−005 |
| S2 | 0 | 1.83E−003 | −1.04E−004 |
| S1 | 0 | 2.11E−003 | −2.81E−005 |

| Surface | A8 | A10 | A12 |
|---|---|---|---|
| S10 | 1.84E−005 | −1.01E−006 | 9.76E−008 |
| S9 | 3.69E−006 | −2.17E−007 | 1.33E−008 |
| S6 | −2.48E−006 | 1.19E−007 | −2.60E−009 |
| S5 | 6.31E−006 | −2.28E−007 | 3.42E−009 |
| S4 | −4.22E−006 | 6.90E−008 | 3.49E−010 |
| S3 | 1.65E−006 | −1.15E−007 | 4.42E−010 |
| S2 | 1.09E−005 | −3.87E−007 | 1.82E−009 |
| S1 | 6.16E−006 | −2.51E−007 | 3.90E−009 |

Figure 2A:
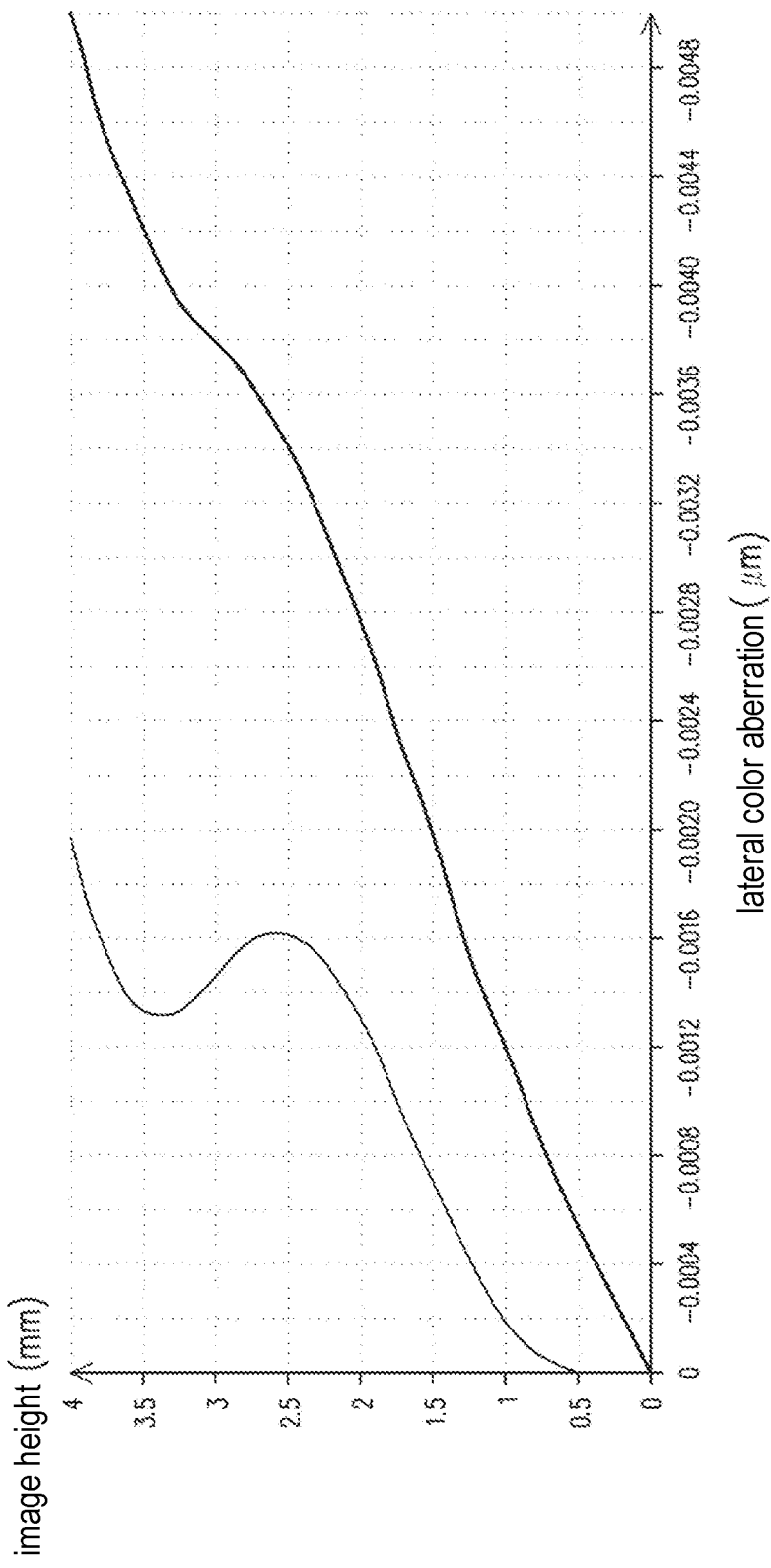
FIG. 2A is a lateral color aberration plot of an optical lens of FIG. 1.
Figure 2B:
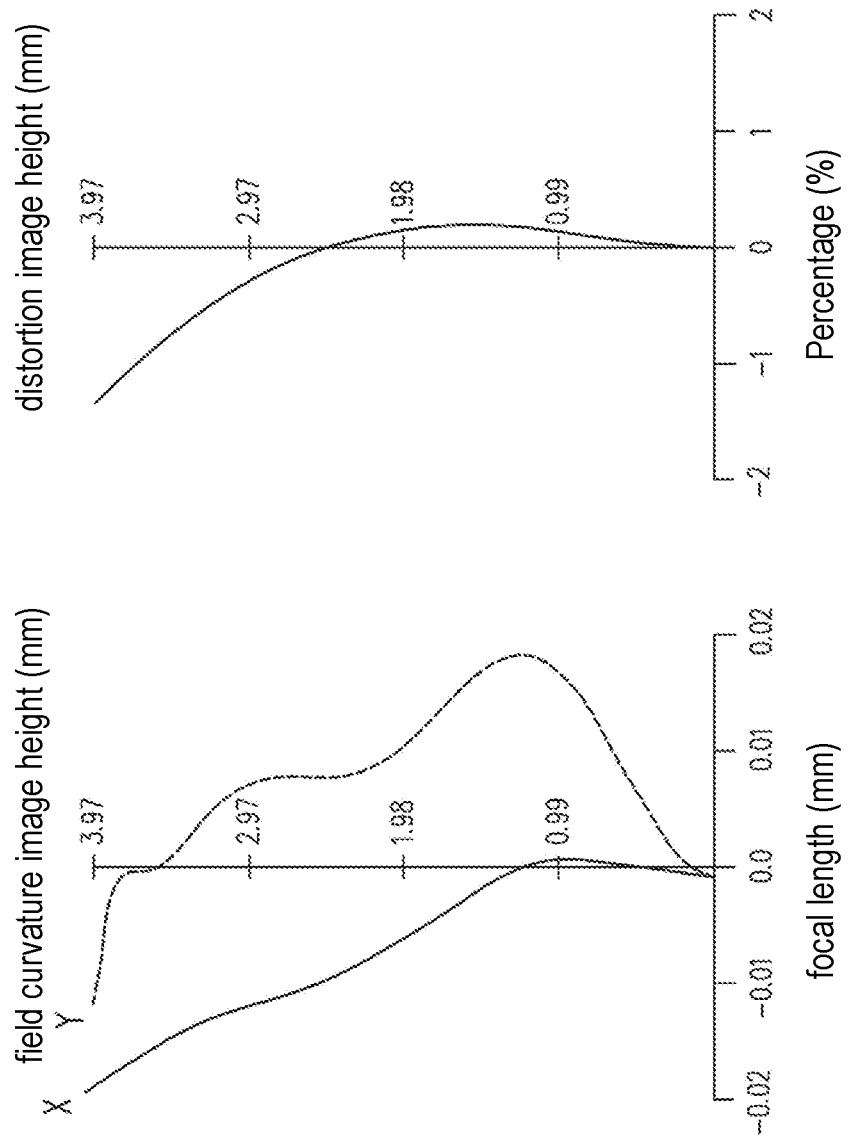
FIG. 2B depicts an astigmatism field curvature plot and a distortion plot of the optical lens of FIG. 1.
Figure 2C:
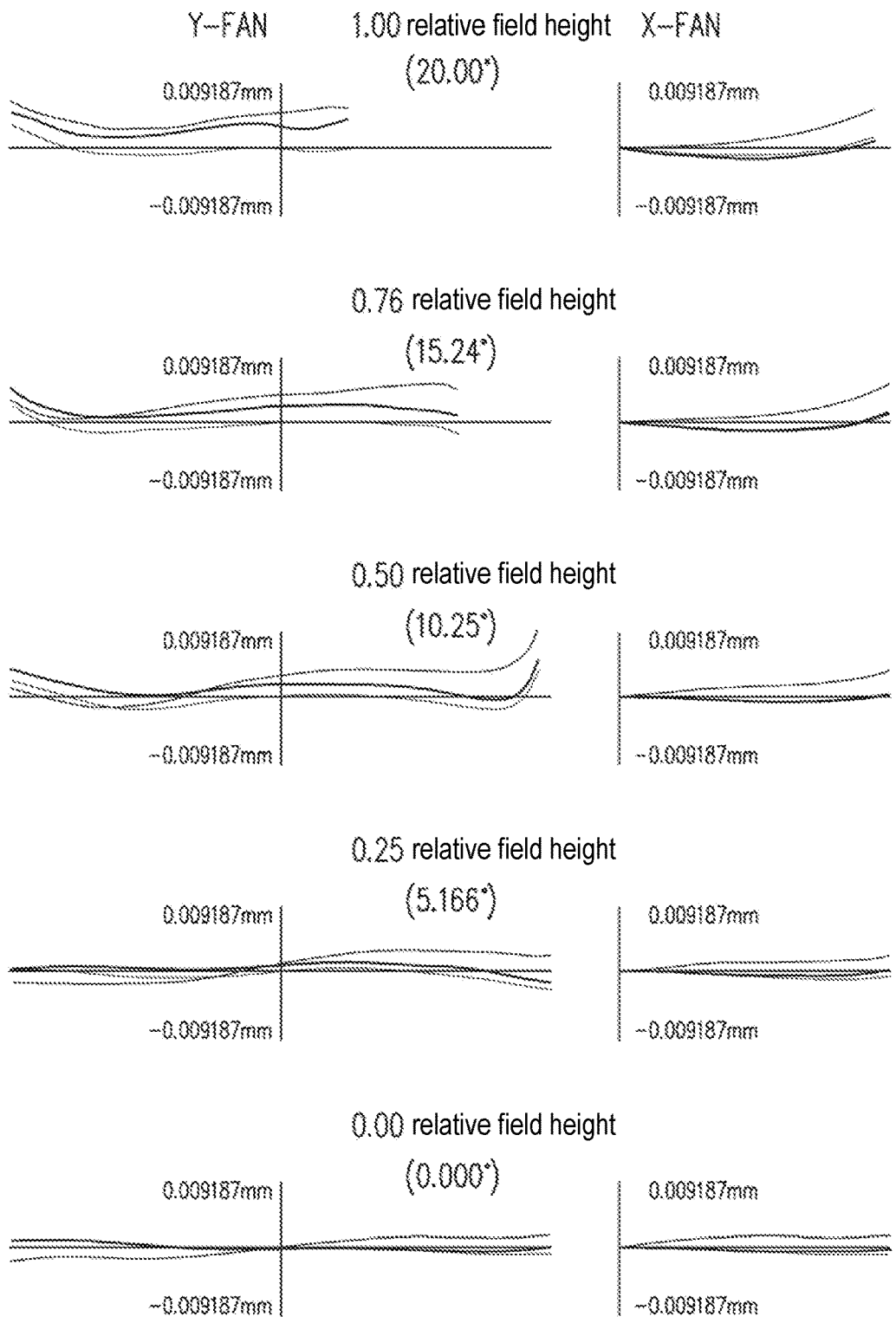
FIG. 2C is a transverse ray fan plot of the optical lens of FIG. 1.
Figure 2D:
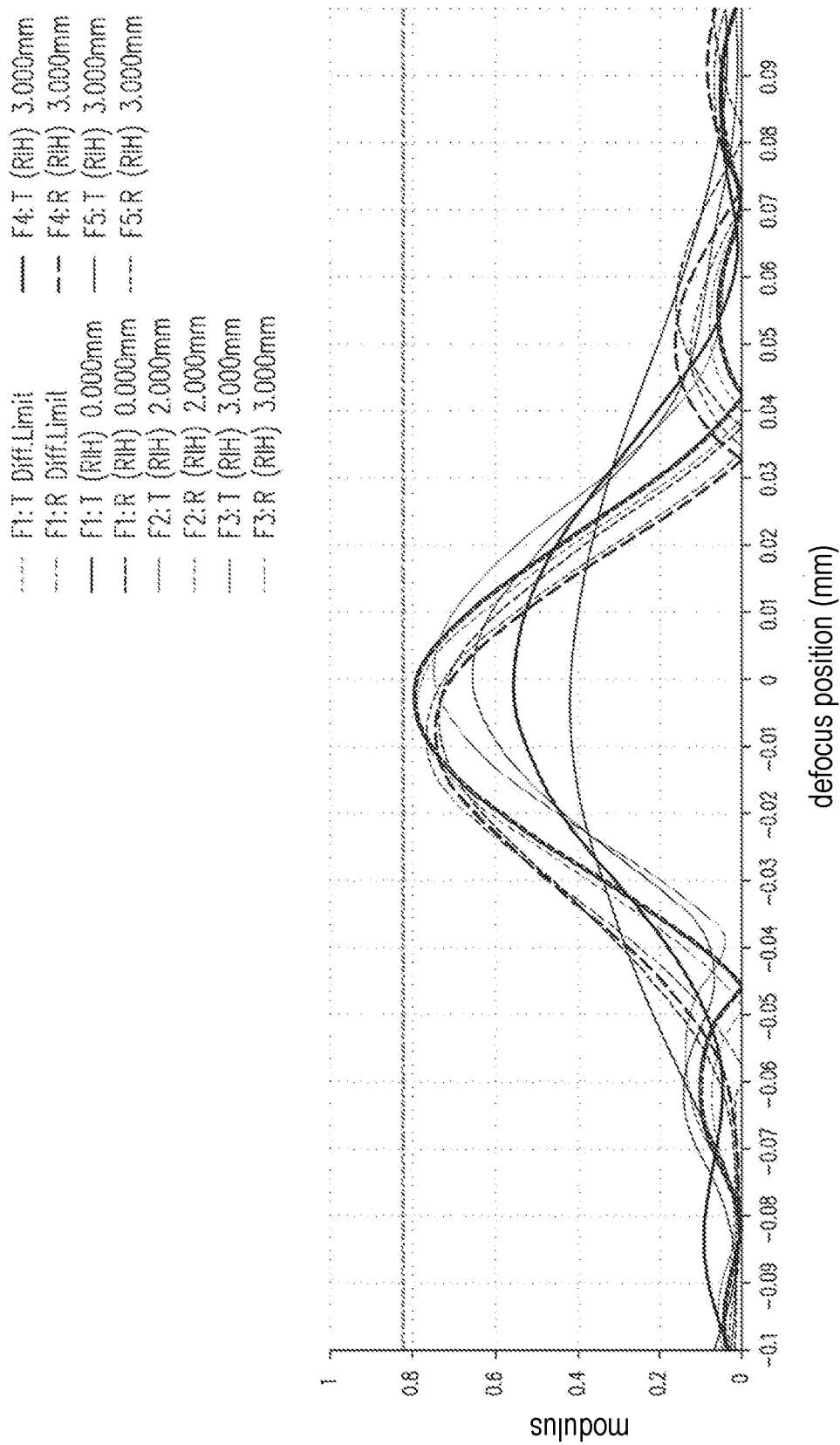
FIG. 2D is a modulation transfer function curve plot of the optical lens of FIG. 1.
Figure 2E:
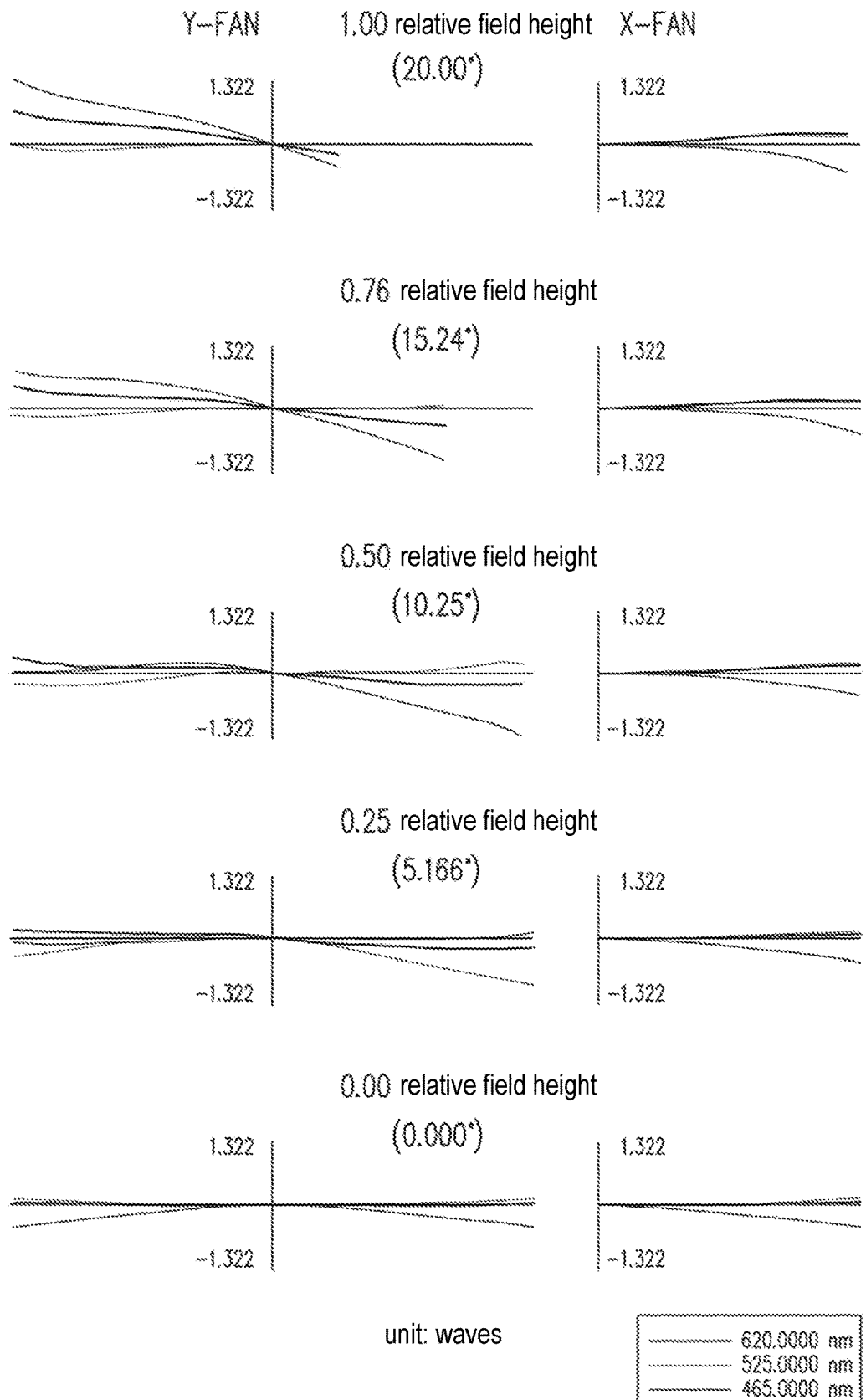
FIG. 2E is simulation data plot of wavefront optical path differences at different image heights of the optical lens of FIG. 1.
Figure 2F:
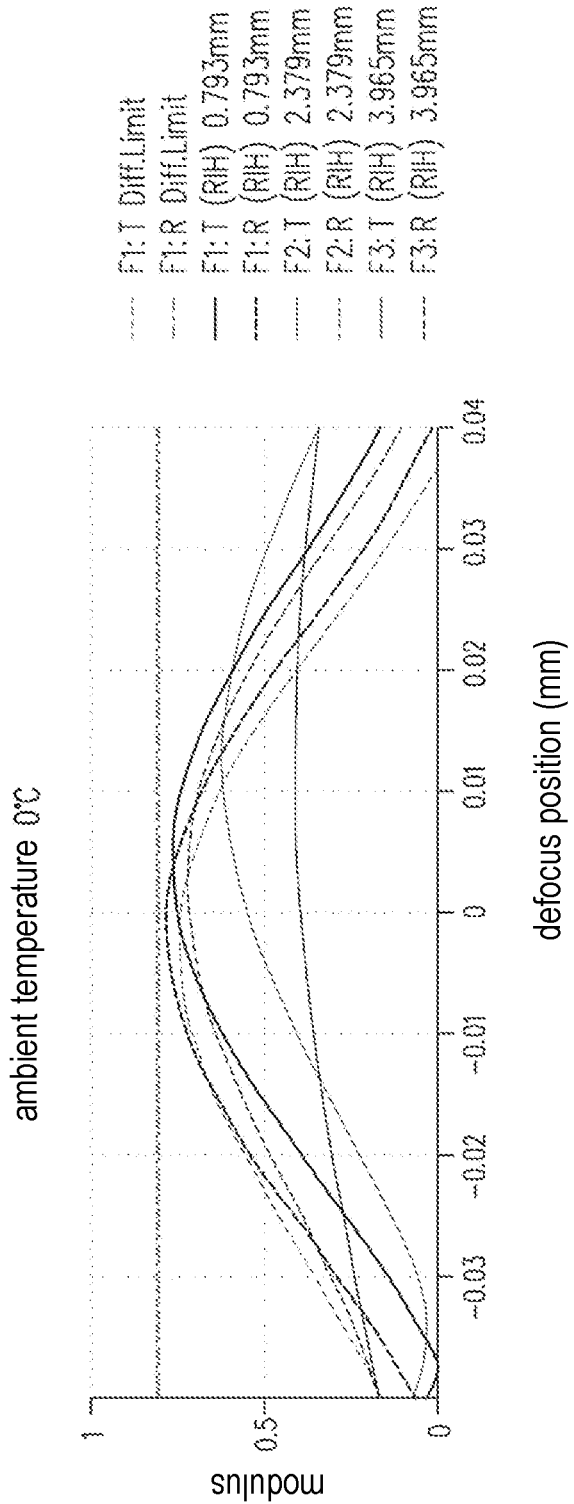
FIG. 2F to FIG. 2J are modulation transfer function curve plots of an optical lens of the optical lens of FIG. 1 under different temperatures.
Figure 2G:
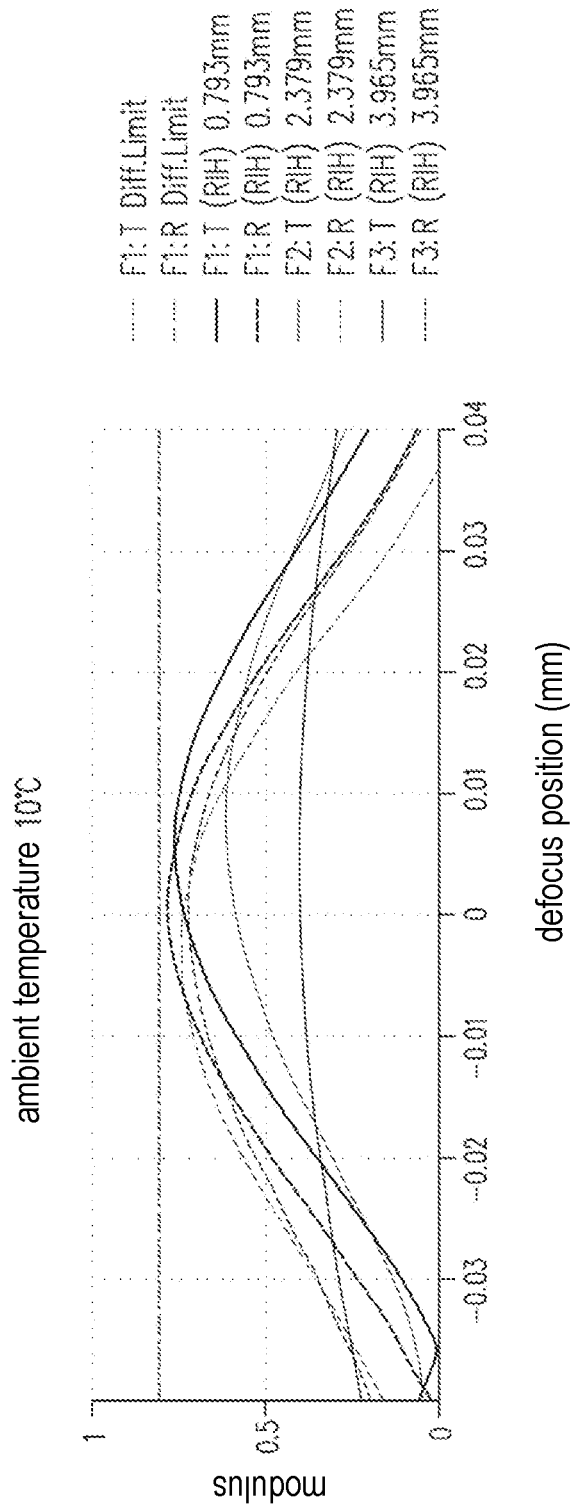
Figure 2H:
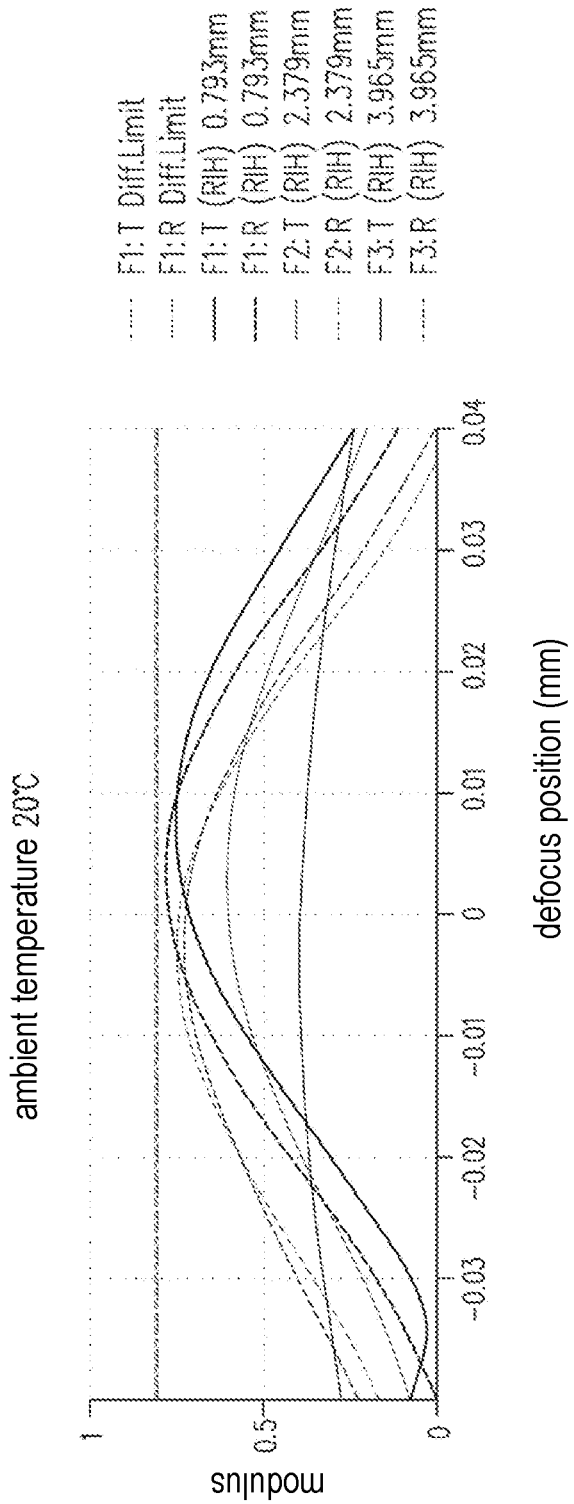
Figure 2I:
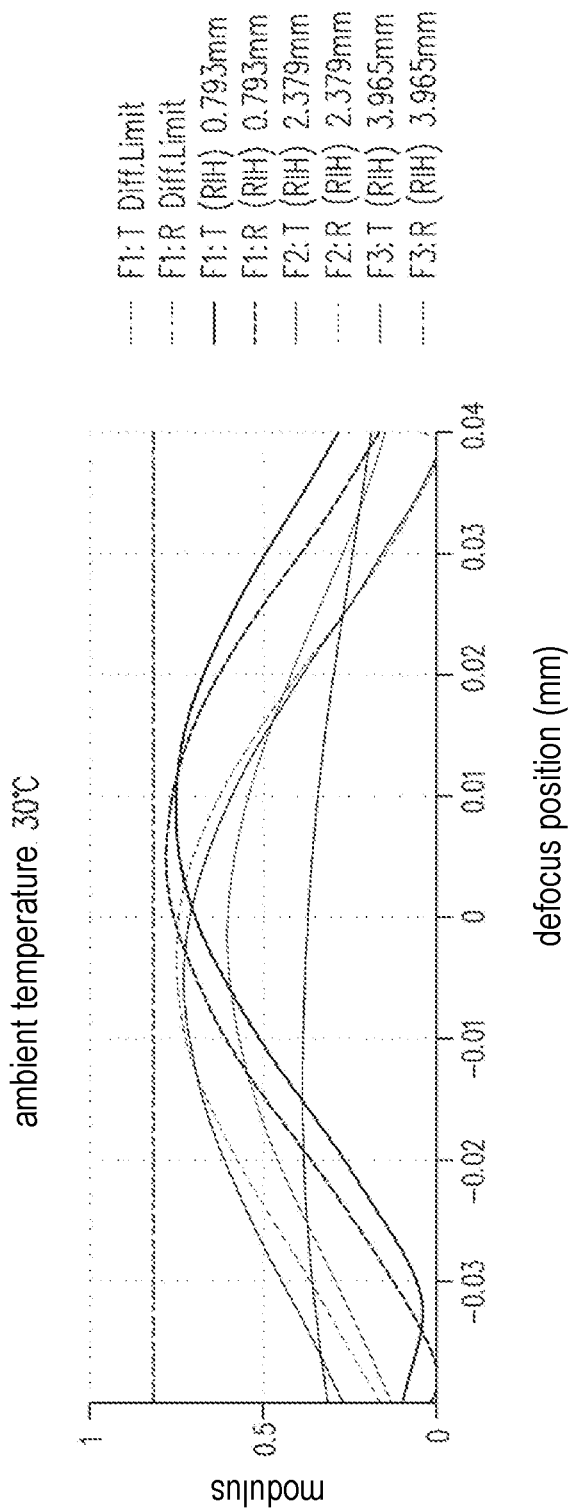
Figure 2J:
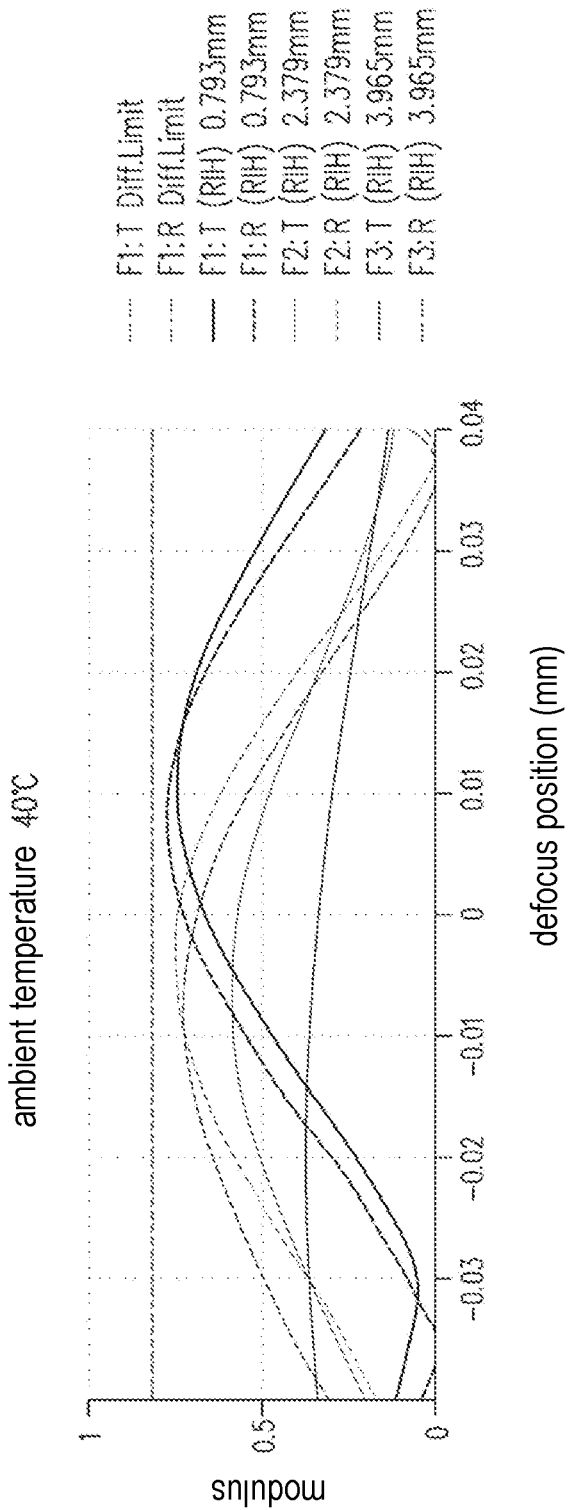

FIG. 2A is a lateral color aberration plot of an optical lens of FIG. 1. FIG. 2B depicts an astigmatism field curvature plot and a distortion plot of the optical lens of FIG. 1, and X is field curvature aberration in a sagittal direction, Y is field curvature aberration in a tangential direction, and 525 nm is taken as an example. FIG. 2C is a transverse ray fan plot of the optical lens of FIG. 1 and is a simulation data plot depicted based on wavelengths of 465 nm, 525 nm, and 620 nm. FIG. 2D is a modulation transfer function curve plot of the optical lens of FIG. 1, in which horizontal coordinates represent focus shifts, and vertical coordinates represent modulus of an optical transfer function (OTF). FIG. 2E is simulation data plot of wavefront optical path differences (OPD) at different image heights of the optical lens of FIG. 1. FIG. 2F to FIG. 2J are modulation transfer function curve plots of an optical lens of the optical lens of FIG. 1 under different temperatures.

The shapes illustrated in FIG. 2A to FIG. 2E are all within the standard range, it is thereby validated that the optical lens 110 of the embodiment achieves a good image effect. Note that in FIG. 2E, it can be known that on an active surface AS of the image generation device 150, an OPD range of the image beam IM is: −1.5λ<OPD<1.5λ, where OPD is an optical path difference among image heights, λ is a wavelength of each color light, and the image beam IM includes red light, green light, and blue light. The active surface AS of the image generation device 150 is a regional surface from which the image beam IM exits. Further, regarding the design of such optical path difference, a person of ordinary skill in the art may easily know that the optical path difference among image heights of the image beam required to be provided by the image source may be obtained through reverse deduction from an object plane by means of optical simulation when designing an optical lens. In the embodiment, the design of the optical lens 110 is complied with a predetermined specification, and the optical lens 110 may analyze images with a resolution of at least 931 p/mm, so that the optical lens 110 exhibits high resolution. Besides, it can be seen that the shapes shown from FIG. 2F to FIG. 2J are all within the standard range in different ambient temperatures (the ambient temperatures from FIG. 2F to FIG. 2J respectively are 0 degree, 10 degrees, 20 degrees, 30 degrees, and 40 degrees), it is thereby validated that the optical lens 110 of the embodiment exhibits good thermal stability.

In the embodiment, one of the scenarios is that the optical lens 110 of FIG. 1 satisfies 1<(A+C)/B<2.5, where A is a distance from the beam waist ST to an edge of a lens barrel (not shown) installed with the optical lens 110, that is, an optical path distance from the beam waist ST to the position where the fifth lens element 119 is closest to the beam waist ST. B is a total lens length of the optical lens 110, that is, a distance from the surface S1 of the first lens element 111 facing the light incident side IS to the surface S10 of the fifth lens element 119 facing the light exit side ES on the optical axis OA. C is a distance from the surface S1 of the first lens element 111 facing the light incident side IS to the image generation device 150 on the optical axis OA, that is, a distance from the surface S1 of the first lens element 111 of the optical lens 110 facing the light incident side IS and the active surface AS of the image generation device 150 on the optical axis OA. Besides, D is additionally defined as a clear aperture of a largest lens element in the optical lens 110. In this embodiment, the clear aperture of the largest lens element of the optical lens 110 is, for example, a clear aperture of the fourth lens element 117. Moreover, FOV is a field of view of the optical lens 110, E is a diameter of the beam waist ST, and F is a diagonal length of the active surface AS of the image generation device 150. In the embodiment, the above parameters A, B, C, D, E, and F respectively are, for example, 10.2 millimeters, 10.72 millimeters, 12 millimeters, 8.6 millimeters, 4 millimeters, 7.93 millimeter, and (A+C)/B is 2.07. Numerical values of these parameters are not intended to limit the invention. In this embodiment, the field of view of the optical lens 110 is 40 degrees.

Figure 3:
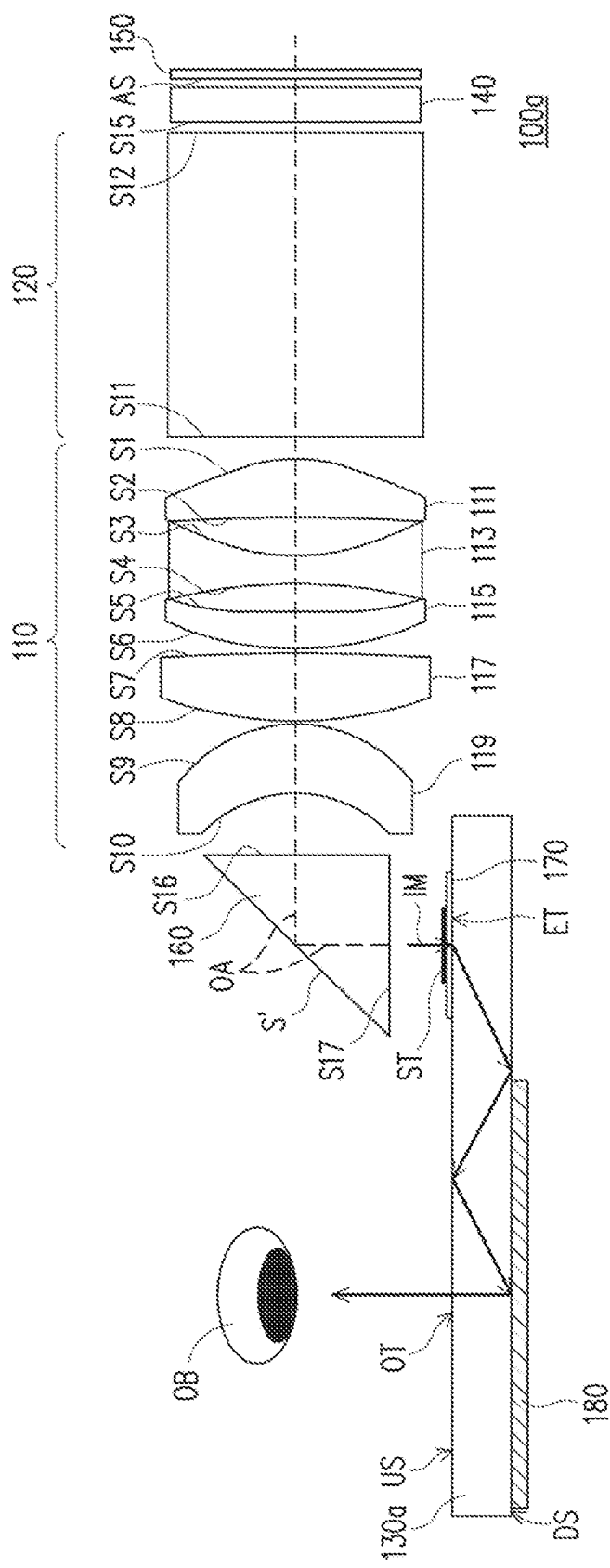
FIG. 3 is a schematic diagram of a waveguide display according to another embodiment of the invention.

FIG. 3 is a schematic diagram of a waveguide display according to another embodiment of the invention. With reference to FIG. 3, a waveguide display 100a of this embodiment is generally similar to the waveguide display 100 of FIG. 1, and a difference therebetween lies in that: the waveguide display 100a further includes a turning prism 160, an anti-reflection device 170, and a reflection device 180. The turning prism 160 (a first prism) is disposed between the optical lens 110 and the beam waist ST. The waveguide device 130a has an upper surface US and a lower surface DS opposite to each other and has an optical coupling entrance ET and an optical coupling exit OT opposite to each other. The optical coupling entrance ET and the optical coupling exit OT respectively are a surface region where the image beam IM enters the waveguide device 130a and a surface region where the image beam IM leaves the waveguide device 130a. The beam waist ST is formed at the optical coupling entrance ET. The optical coupling entrance ET is located at one end of the upper surface US, and the anti-reflection device 170 is disposed at the optical coupling entrance ET. Herein, the anti-reflection device 170 may be, for example, an anti-reflection layer coated on the optical coupling entrance ET, or the anti-reflection device 170 may be an anti-reflection structure formed by surface treatment at the optical coupling entrance ET. The optical coupling exit OT is located at the other end of the upper surface US of the waveguide device 130a, and the reflection device 180 is disposed on the lower surface DS opposite to the upper surface US where the optical coupling entrance OT is located. Herein, the reflection device 180 may be, for example, a reflection layer coated on the optical coupling exit OT, or the reflection device 180 may be a reflection structure formed by surface treatment at the optical coupling exit OT. The anti-reflection device 170 is configured to allow the image beam IM to enter the waveguide device 130a easily, so a ratio of reflection by the surface of the waveguide device 130a is thereby decreased. The reflection device 180 may reflect the image beam IM transmitted in the waveguide device 130a and sets the image beam IM to be transmitted towards the optical coupling exit OT, so that the image beam IM inside the waveguide device 130a may leave the waveguide device 130a easily.

In this embodiment, the image beam IM leaves the optical lens 110, and changes a transmitting direction after being reflected by the turning prism 160, and is converged to the beam waist ST. The image beam IM is diverged after passing through the beam waist ST and enters the waveguide device 130a after passing through the optical coupling entrance ET. The image beam IM is totally reflected one or more times on the upper and the lower surfaces US and DS of the waveguide device 130a, leaves the waveguide device 130a from the optical coupling exit OT, and is then projected to a target OB. The projection target OB herein is, for example, a human eye.

In addition, an example of the optical lens 110 applied to the waveguide display 100a is provided as follows. Note that the invention is not limited to the data listed as follows. It should be known to a person of ordinary skill in the art that various modifications and variations can be made to the parameters or configurations of the invention with reference to the invention, and such modifications and variations still belong to the scope of the invention.

TABLE THREE

| Device | Surface | Radius of Curvature (mm) | Gap (mm) | Index of Refraction | Abbe Number | Optical Effective Radius (mm) |
|---|---|---|---|---|---|---|
| Object | | infinity | | | | |
| Stop ST | | infinity | 2.32 | | | 2 |
| Turning Prism 160 | S17 | infinity | 6 | 1.83 | 42.7 | 2.3 |
| | S16 | infinity | 1.77 | | | 2.9 |
| Fifth Lens Element 119 | S10 | −4.00 | 2.25 | 1.53 | 55.7 | 3.0 |
| | S9 | −4.46 | 0.1 | | | 3.8 |
| Fourth Lens Element 117 | S8 | 13.23 | 2.19 | 1.79 | 44.2 | 4.3 |
| | S7 | −52.39 | 0.1 | | | 4.3 |
| Third Lens Element 115 | S6 | 8.52 | 1.22 | 1.53 | 55.7 | 4.2 |
| | S5 | 508.61 | 0.84 | | | 4.1 |
| Second Lens Element 113 | S4 | −17.96 | 0.95 | 1.63 | 23.3 | 4.1 |
| | S3 | 5.26 | 1.24 | | | 4.0 |
| First Lens Element 111 | S2 | −17.84 | 1.83 | 1.53 | 55.7 | 4.0 |
| | S1 | −5.36 | 0.5 | | | 4.1 |
| Illumination Prism 120 | S11 | infinity | 9.8 | 1.83 | 42.7 | 4.1 |
| | S12 | infinity | 0.3 | | | 4.0 |
| Glass Cover 140 | S15 | | | | | |

In addition, since the surfaces and parameters of the lens elements 111, 113, 115, 117, and 119 of the optical lens 110 of FIG. 3 are designed to be identical to that of the optical lens of FIG. 1, description thereof is not repeated herein.

In this embodiment, one of the scenarios is that the optical lens 110 of FIG. 3 satisfies 1<(A+C)/B<2.5. Definitions of other parameters A, B, C, D, E, and F are identical to that provided above. In the embodiment, the above parameters A, B, C, D, E, and F respectively are, for example 8.52 millimeters, 10.72 millimeters, 12 millimeters, 8.6 millimeters, 4 millimeters, 7.93 millimeter, and (A+C)/B is 1.91. Numerical values of these parameters are not intended to limit the invention. In this embodiment, the field of view of the optical lens 110 is 40 degrees.

Figure 4:
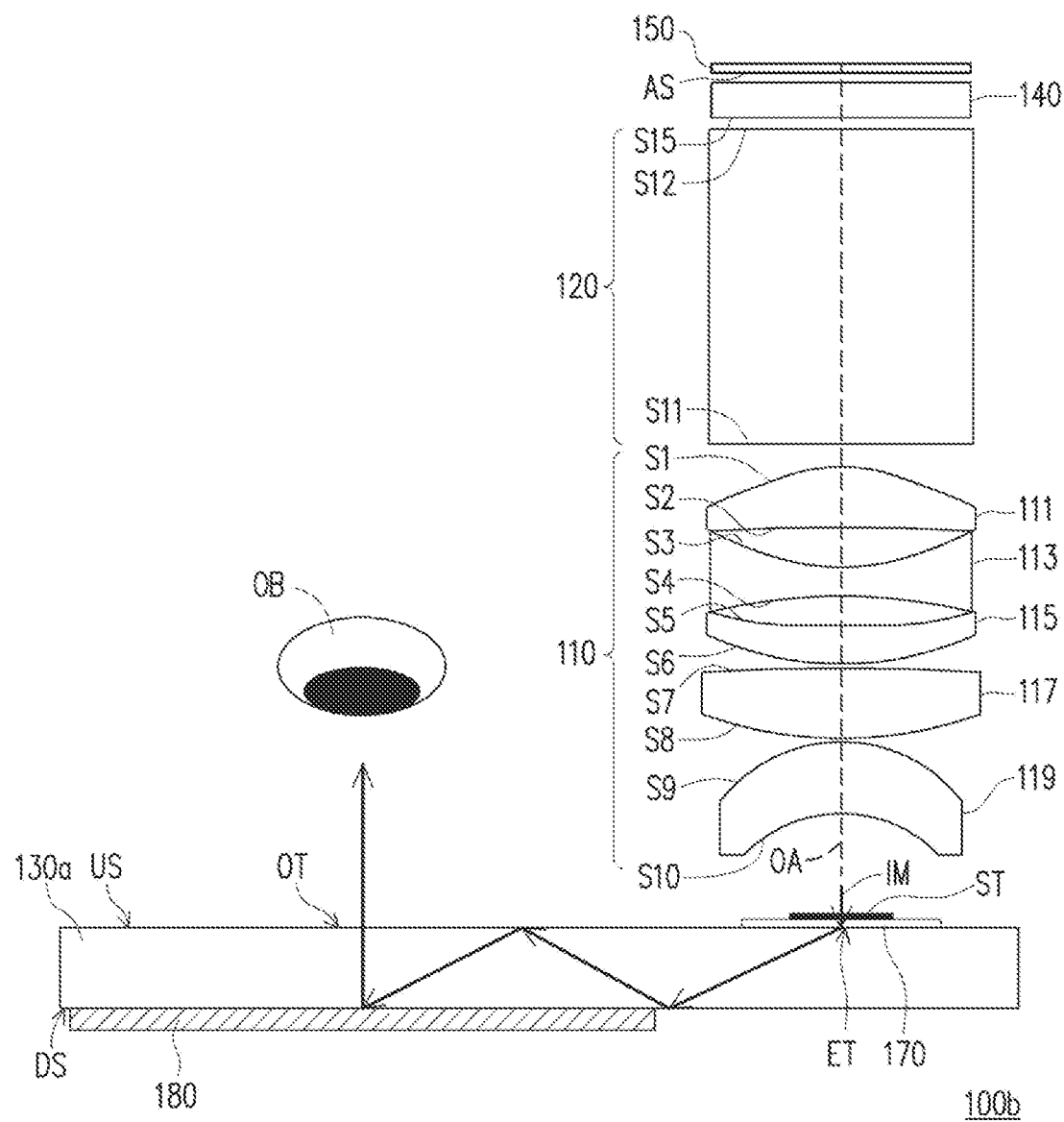
FIG. 4 is a schematic diagram of a waveguide display according to still another embodiment of the invention.

FIG. 4 is a schematic diagram of a waveguide display according to still another embodiment of the invention. With reference to FIG. 4, a waveguide display 100b of this embodiment is similar to the waveguide display 100a of FIG. 3, and a main difference therebetween lies in that: the optical lens 110, the illumination prism 120, the glass cover 140, and the image generation device 150 are disposed right above the optical coupling entrance ET together, and the turning prism 160 as shown in FIG. 3 is not disposed between the optical lens 110 and the waveguide device 130a.

An example of the optical lens 110 applied to the waveguide display 100b is provided as follows. Note that the invention is not limited to the data listed as follows. It should be known to a person of ordinary skill in the art that various modifications and variations can be made to the parameters or configurations of the invention with reference to the invention, and such modifications and variations still belong to the scope of the invention.

TABLE FOUR

| Device | Surface | Radius of Curvature (mm) | Gap (mm) | Index of Refraction | Abbe Number | Optical Effective Radius (mm) |
|---|---|---|---|---|---|---|
| Object | | infinity | | | | |
| Stop ST | | infinity | 7.31 | | | 2 |
| Fifth Lens Element 119 | S10 | −4.00 | 2.25 | 1.53 | 55.7 | 3.0 |
| | S9 | −4.46 | 0.10 | | | 3.8 |
| Fourth Lens Element 117 | S8 | 13.23 | 2.19 | 1.79 | 44.2 | 4.3 |
| | S7 | −52.39 | 0.1 | | | 4.3 |
| Third Lens Element 115 | S6 | 8.52 | 1.22 | 1.53 | 55.7 | 4.2 |
| | S5 | 508.61 | 0.84 | | | 4.1 |
| Second Lens Element 113 | S4 | −17.96 | 0.95 | 1.63 | 23.3 | 4.1 |
| | S3 | 5.26 | 1.24 | | | 4.0 |
| First Lens Element 111 | S2 | −17.84 | 1.83 | 1.53 | 55.7 | 4.0 |
| | S1 | −5.36 | 0.5 | | | 4.1 |
| Illumination Prism 120 | S11 | infinity | 9.8 | 1.83 | 42.7 | 4.1 |
| | S12 | infinity | 0.3 | | | 4.0 |
| Glass Cover 140 | S15 | | | | | |

In this embodiment, after leaving the optical lens 110, the image beam IM enters the waveguide device 130a directly from the optical coupling entrance ET. The image beam IM is totally reflected one or more times on the upper and the lower surfaces US and DS of the waveguide device 130a, leaves the waveguide device 130a from the optical coupling exit OT, and is then projected to the target OB.

In this embodiment, one of the scenarios is that the optical lens 110 of FIG. 4 satisfies $<(A+C)/B<2.5$. Definitions of other parameters A, B, C, D, E, and F are identical to that provided above. In the embodiment, the above parameters A, B, C, D, E, and F respectively are, for example 5.74 millimeters, 10.72 millimeters, 12 millimeters, 8.6 millimeters, 4 millimeters, 7.93 millimeter, and (A+C)/B is 1.655. Numerical values of these parameters are not intended to limit the invention. In this embodiment, the field of view of the optical lens 110 is 40 degrees.

Note that the optical lens 110 of FIG. 1 to FIG. 4 includes a total of five lens elements, but the invention is not limited thereto. A diameter of the beam waist ST is approximately 4 mm, which is closes to the size of the pupil of an average human eye (approximately 3 mm to 6 mm). The image generation device 150 uses, for example, a 0.3-inch 720P DMD apparatus and has a diagonal of 7.93 mm. Moreover, the diagonal of the image generation device 150 represents an image circle of the optical lens 110. Under the design of the optical lens 110 provided herein, the human eye may see a virtual image equivalent to 57.3 inches 2 meters away, and the magnification at this time is substantially 184 times.

In addition, in the embodiment, a relation formula between the focal length and the image height of the optical lens 110 of FIG. 1 to FIG. 4 is as follows: image height=focal length×tan (half field of view). Herein, the image height is, for example, 3.965 mm, and if the field of view is designed to be 40 degrees, the half field of view is 20 degrees, so that an effective focal length of the optical lens 110 is approximately 10.89 mm. Besides, the optical lens 110 of FIG. 1 to FIG. 4 satisfies $1<|f5/f4|<15$ and $V5-V4<25$, where f4 is a focal length of the fourth lens element 117 of the optical lens 110, f5 is a focal length of the fifth lens element 119 of the optical lens 110, V4 is an Abbe number of the fourth lens element 117, and V5 is an Abbe number of the fifth lens element 119. In the embodiment, the above parameters f4, f5, V4, and V5 respectively are, for example, 13.52 millimeters, 100.01 millimeters, 44, and 56, and f5/f4 is 7.4 and V5-V4 is 12. Numerical values of these parameters are not intended to limit the invention.

Figure 5:
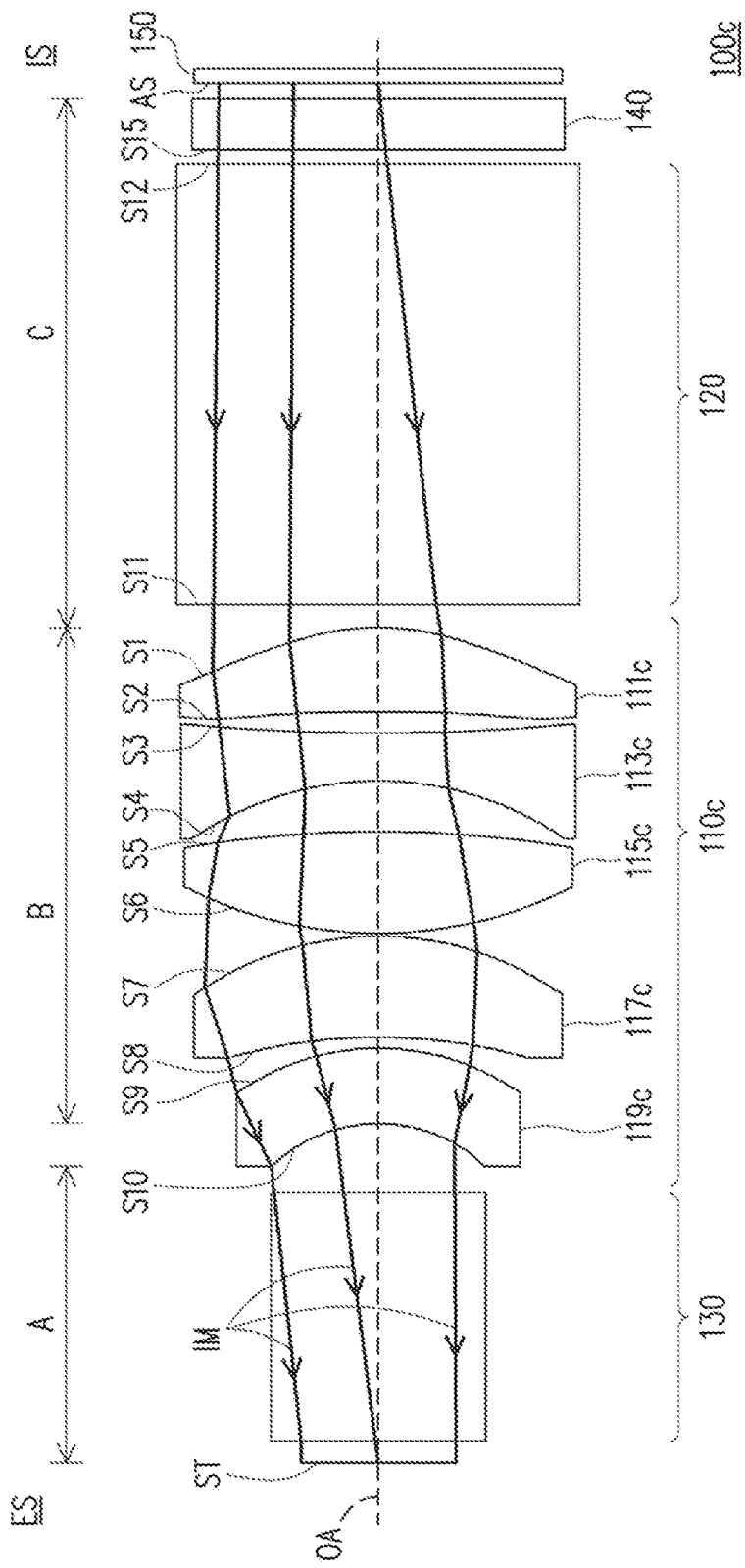
FIG. 5 is a schematic diagram of a waveguide display according to another embodiment of the invention.

FIG. 5 is a schematic diagram of a waveguide display according to another embodiment of the invention. With reference to FIG. 5, a waveguide display 100c of this embodiment is generally similar to the waveguide display 100 of FIG. 1, and a difference therebetween lies in that: A combination of the refracting power and corresponding and included optical parameters of an optical lens 110c and the combination of the refracting power and corresponding and included optical parameters of the optical lens 110 are slightly different. In detail, the optical lens 110c includes a first lens element 111c, a second lens element 113c, a third lens element 115c, a fourth lens element 117c, and a fifth lens element 119c sequentially arranged from the light incident side IS to the light exit side ES as well, and refracting powers of the lens elements sequentially are positive, negative, positive, positive, and negative. In this embodiment, the first, second, third, and fifth lens elements 111c, 113c, 115c, and 119c are plastic aspheric lens elements, and the fourth lens element 117c is a glass spherical lens element.

Besides, surface shapes of the lens elements are different as well. Surface shapes of the first, second, fourth, and fifth lens elements 111c, 113c, 117c, and 119c in FIG. 5 are similar to that of the first, second, fourth, and fifth lens elements 111, 113, 115, and 119 provided in FIG. 1. A main difference therebetween lies in that: the third lens element 115c in FIG. 5 is a biconvex lens element.

An example of the optical lens 110c applied to the waveguide display 100c is provided as follows. Note that the invention is not limited to the data listed as follows. It should be known to a person of ordinary skill in the art that various modifications and variations can be made to the parameters or configurations of the invention with reference to the invention, and such modifications and variations still belong to the scope of the invention.

TABLE FIVE

| Device | Surface | Radius of Curvature (mm) | Gap (mm) | Index of Refraction | Abbe Number | Optical Effective Radius (mm) |
|---|---|---|---|---|---|---|
| Object | | infinity | | | | |
| Stop ST | | infinity | 0.5 | | | 1.6 |
| Waveguide Device 130 | S12 | infinity | 5.5 | 2.00 | 28.3 | 1.7 |
| | S13 | infinity | 1.49 | | | 2.3 |
| Fifth Lens Element 119c | S10 | −3.17 | 1.74 | 1.53 | 55.7 | 2.4 |
| | S9 | −4.54 | 0.15 | | | 3.1 |
| Fourth Lens Element 117c | S8 | −14.03 | 2.19 | 1.83 | 42.7 | 3.5 |
| | S7 | −6.86 | 0.1 | | | 3.9 |
| Third Lens | S6 | 7.64 | 2.29 | 1.53 | 55.7 | 4.1 |

TABLE FIVE-continued

| Device | Surface | Radius of Curvature (mm) | Gap (mm) | Index of Refraction | Abbe Number | Optical Effective Radius (mm) |
|---|---|---|---|---|---|---|
| Element 115c | S5 | −20.74 | 1.17 | | | 4.0 |
| Second Lens | S4 | −5.30 | 1.07 | 1.64 | 22.4 | 4.0 |
| Element 113c | S3 | 20.13 | 0.39 | | | 4.2 |
| First Lens | S2 | −23.20 | 1.91 | 1.53 | 55.7 | 4.3 |
| Element 111c | S1 | −5.20 | 0.5 | | | 4.3 |
| Illumination Prism 120 | S11 | infinity | 9.8 | 1.83 | 42.7 | 4.2 |
| Glass Cover 140 | S12 | infinity | 0.3 | | | 4.0 |
| | S15 | | | | | |

In this embodiment, the first, second, third, and fifth lens elements 111c, 113c, 115c, and 119c are all aspheric lens elements, and the following Table Six lists the parameter values of the above aspheric lens elements.

TABLE SIX

| Surface | K | A4 | A6 |
|---|---|---|---|
| S10 | −3.26E−001 | 9.34E−004 | −1.34E−004 |
| S9 | 0 | −9.83E−005 | 7.52E−005 |
| S6 | 1.61E−001 | −9.41E−004 | 2.36E−005 |
| S5 | 0 | 1.14E−003 | −8.79E−005 |
| S4 | 2.49 E−001 | 1.98E−003 | −3.35E−005 |
| S3 | 4.02 | −1.70E−003 | 3.00E−005 |
| S2 | 0 | 2.08E−003 | −1.52E−004 |
| S1 | 0 | 2.45E−003 | −6.76E−007 |

| Surface | A8 | A10 | A12 |
|---|---|---|---|
| S10 | 2.34E−005 | 3.46E−007 | −2.00E−007 |
| S9 | 1.71E−006 | 1.58E−007 | −1.07E−008 |
| S6 | −9.86E−007 | 3.83E−008 | −9.37E−010 |
| S5 | 6.11E−006 | −3.04E−007 | 6.12E−009 |
| S4 | 1.02E−005 | −6.88E−007 | 1.97E−008 |
| S3 | 2.59E−006 | −1.83E−007 | 3.43E−009 |
| S2 | 9.12E−006 | −3.26E−007 | 4.89E−009 |
| S1 | 2.59E−006 | −1.81E−007 | 5.44E−009 |

Figure 6A:
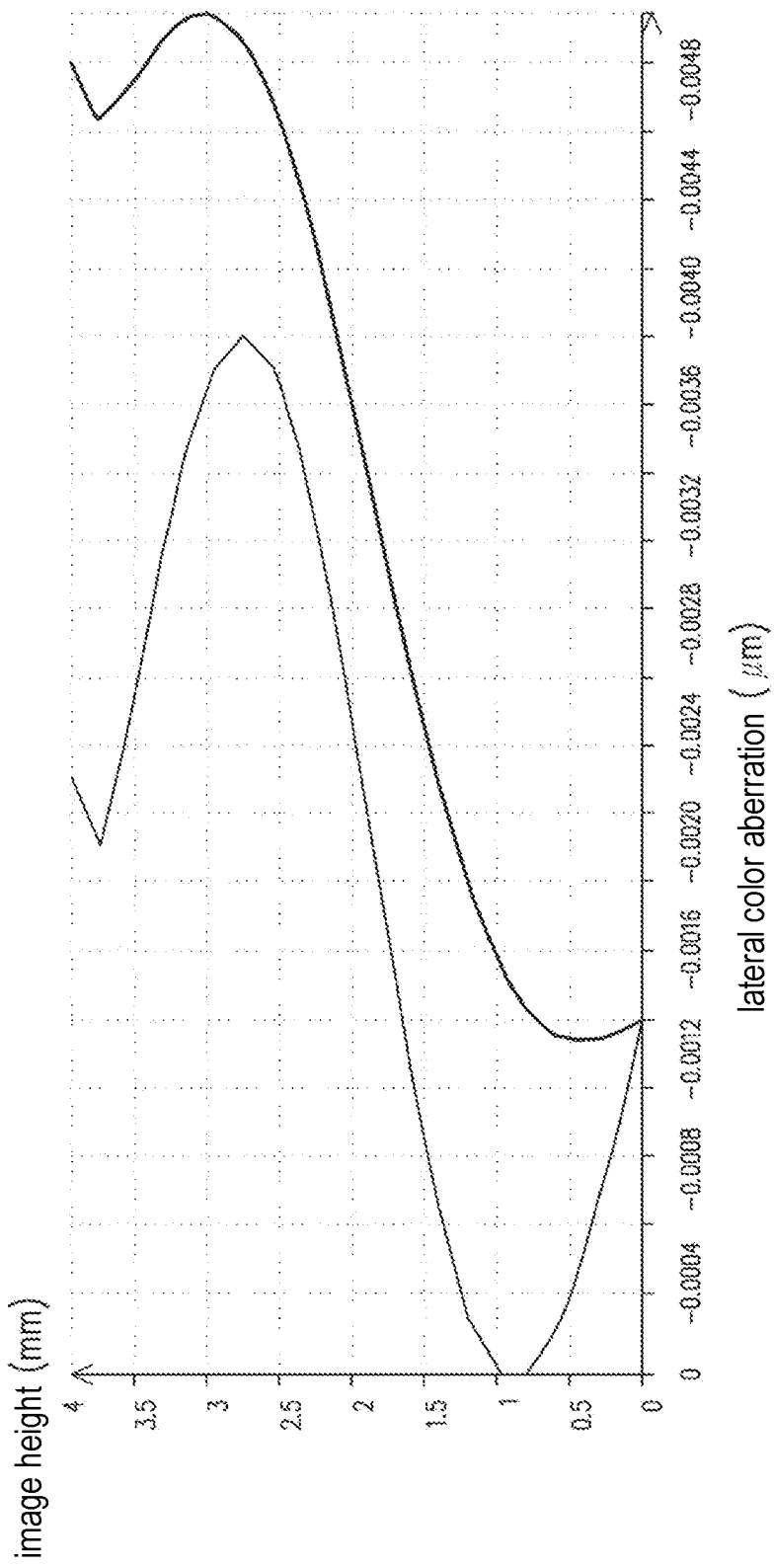
FIG. 6A is a lateral color aberration plot of an optical lens of FIG. 5.
Figure 6B:
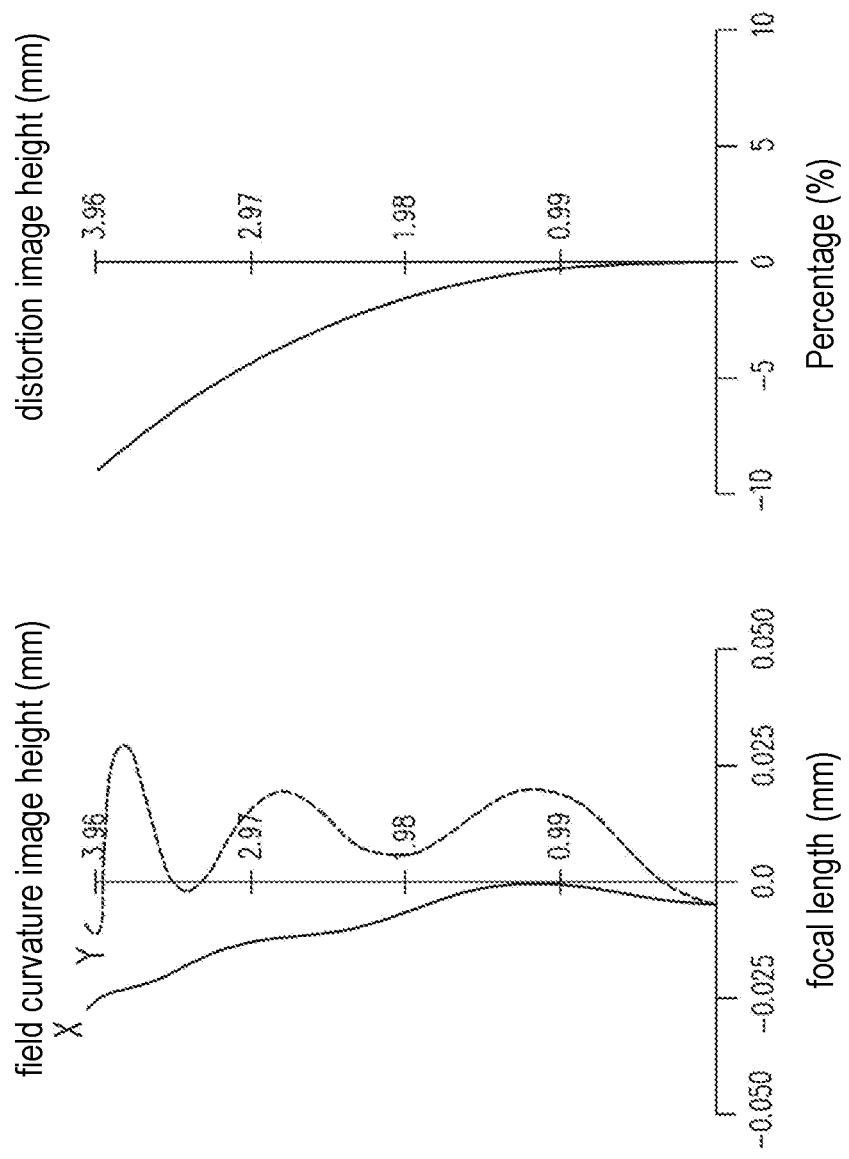
FIG. 6B depicts an astigmatism field curvature plot and a distortion plot of the optical lens of FIG. 5.
Figure 6C:
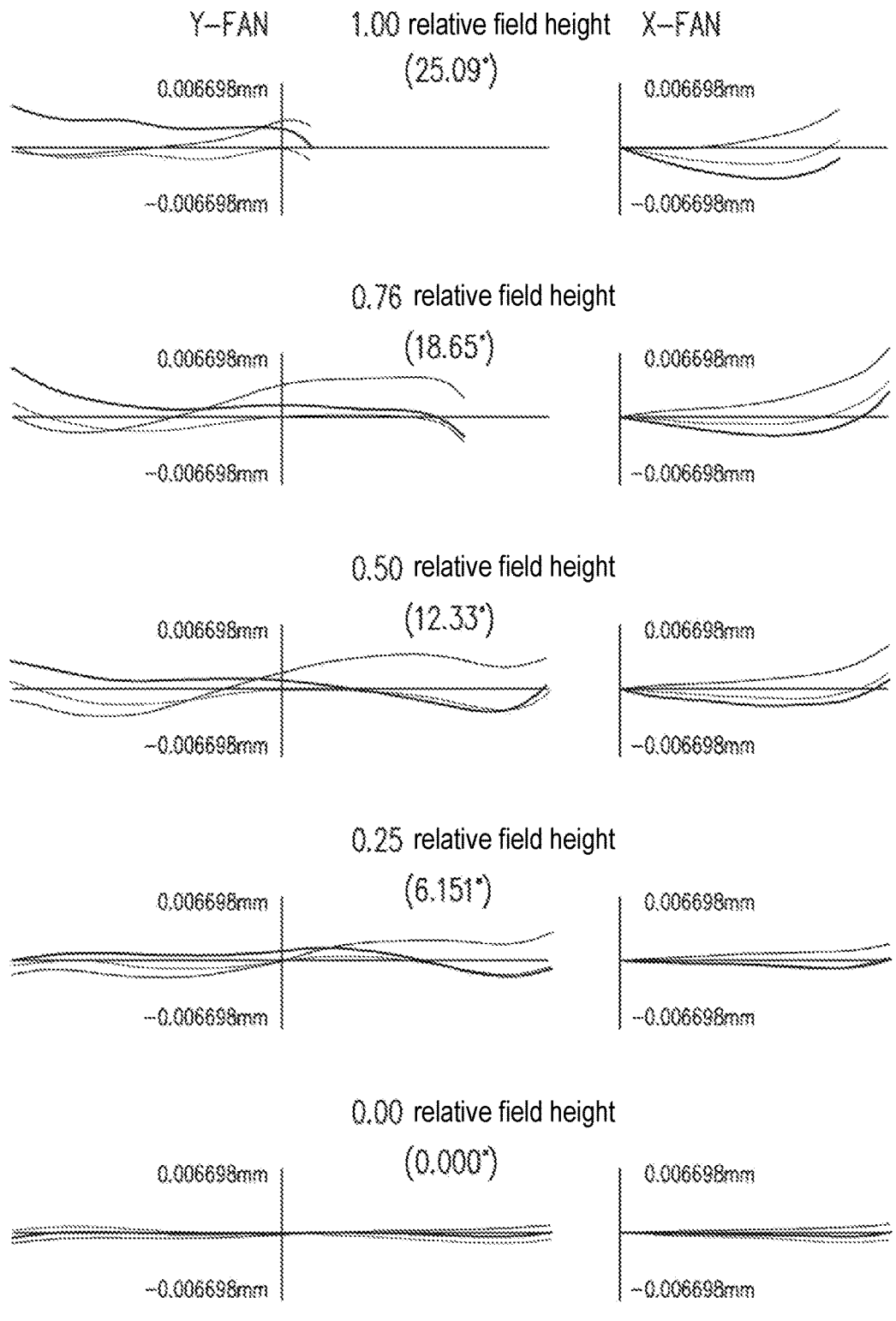
FIG. 6C is a transverse ray fan plot of the optical lens of FIG. 5.
Figure 6D:
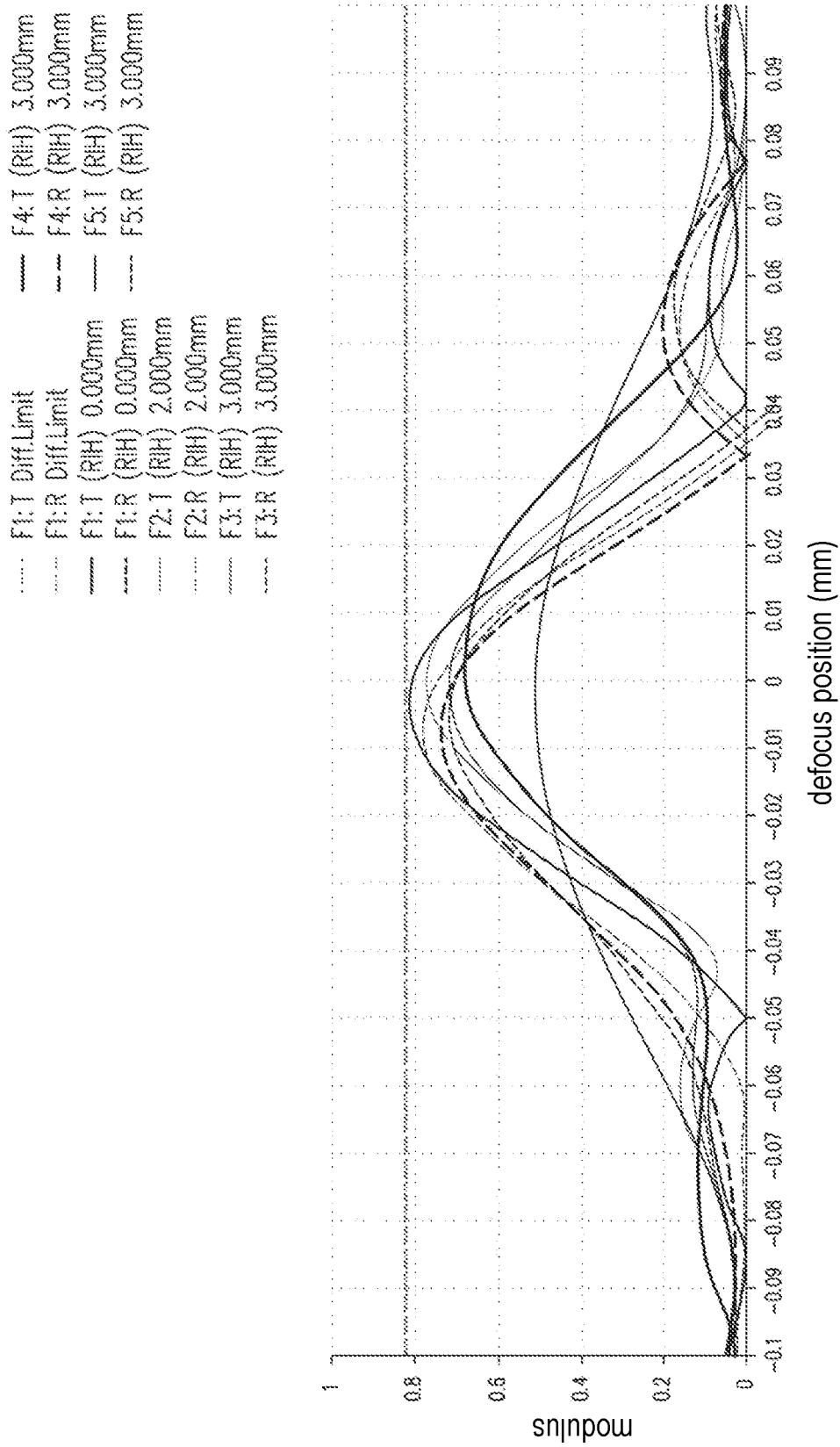
FIG. 6D is a modulation transfer function curve plot of the optical lens of FIG. 5.
Figure 6E:
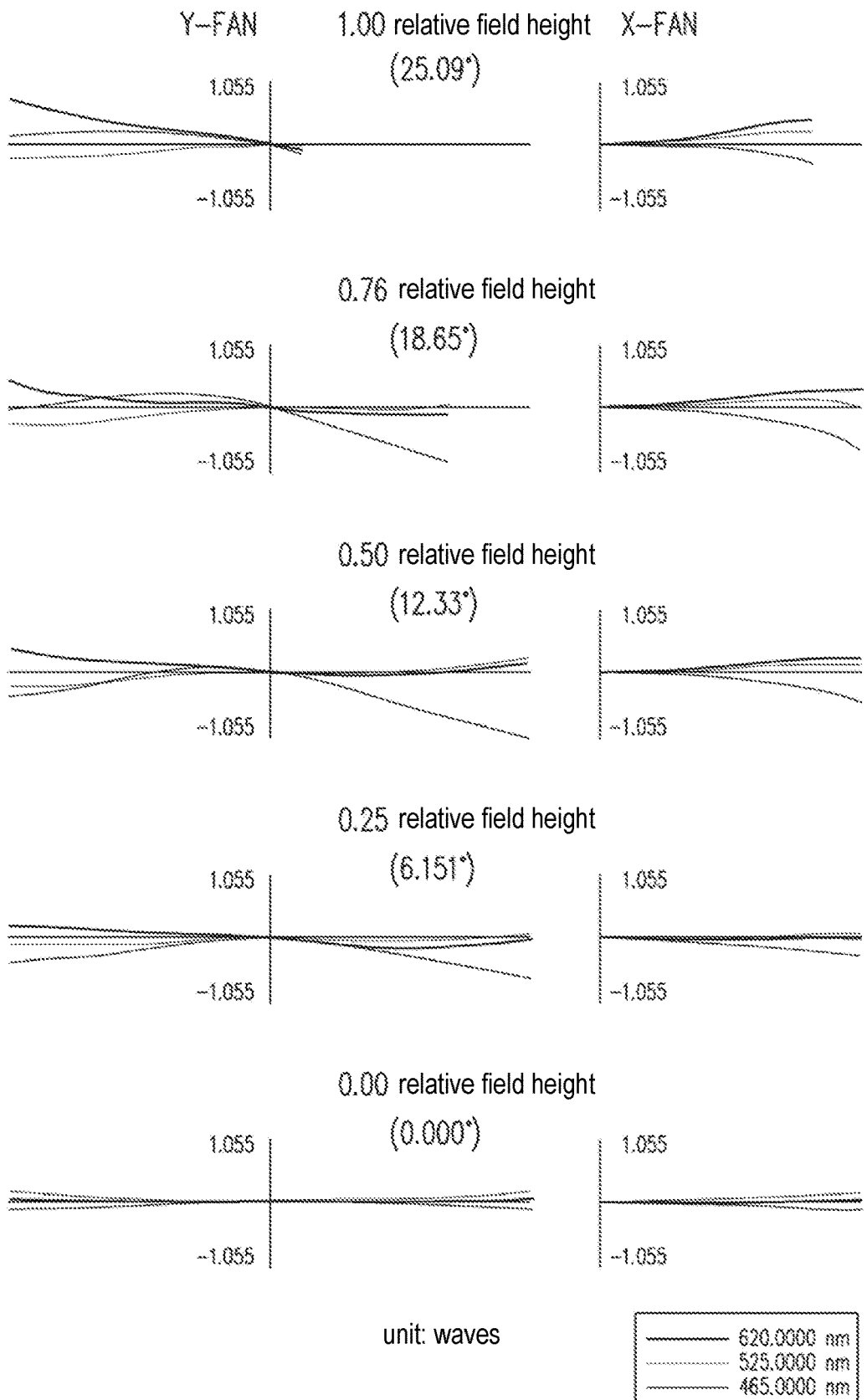
FIG. 6E is simulation data plot of wavefront optical path differences at different image heights of the optical lens of FIG. 5.
Figure 6F:
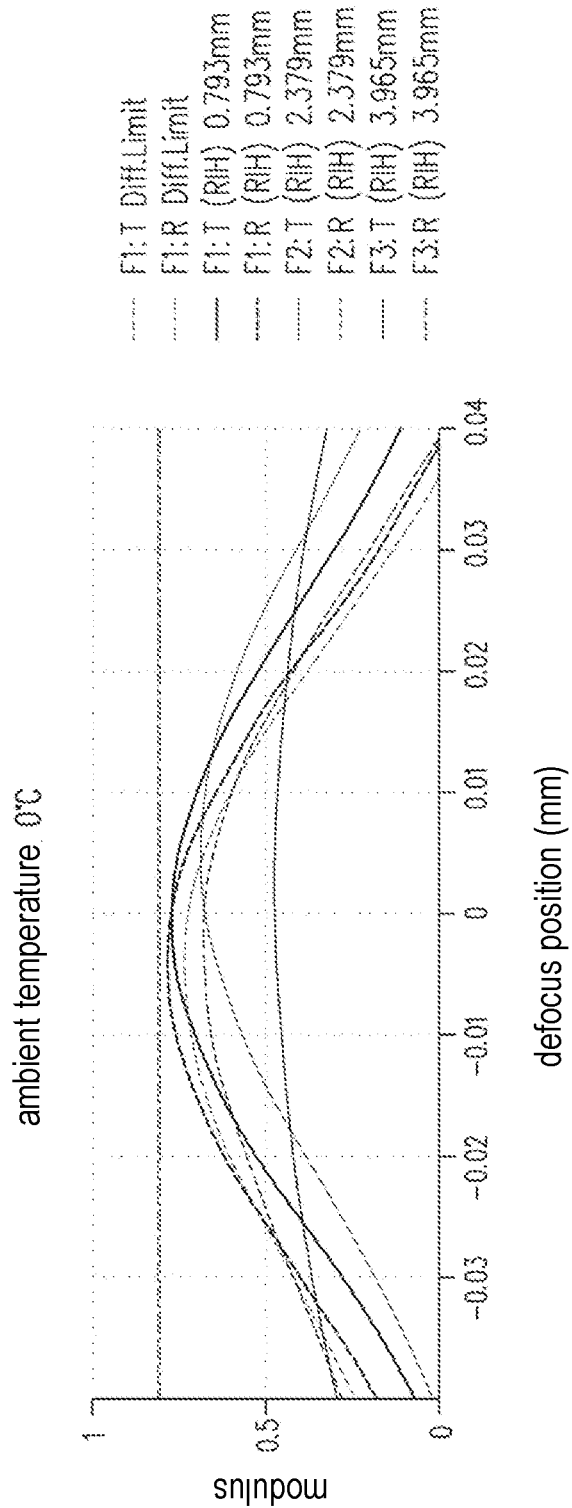
FIG. 6F to FIG. 6J are modulation transfer function curve plots of an optical lens of the optical lens of FIG. 5 under different temperatures.
Figure 6G:
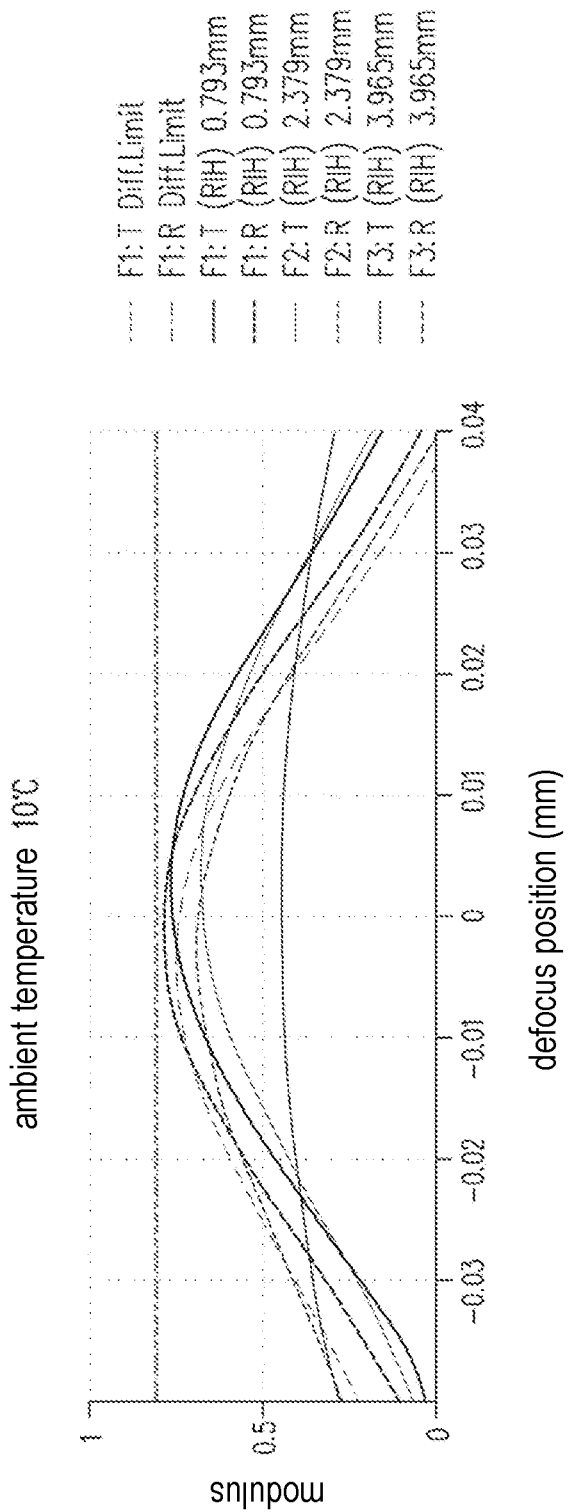
Figure 6H:
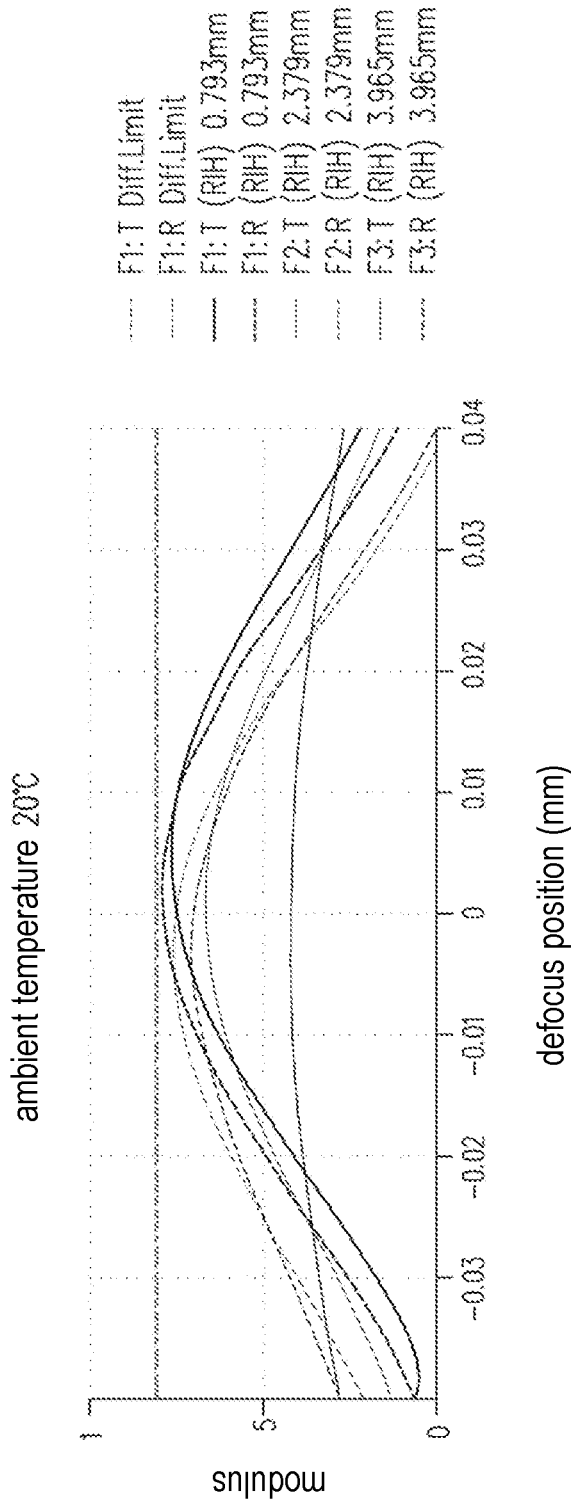
Figure 6I:
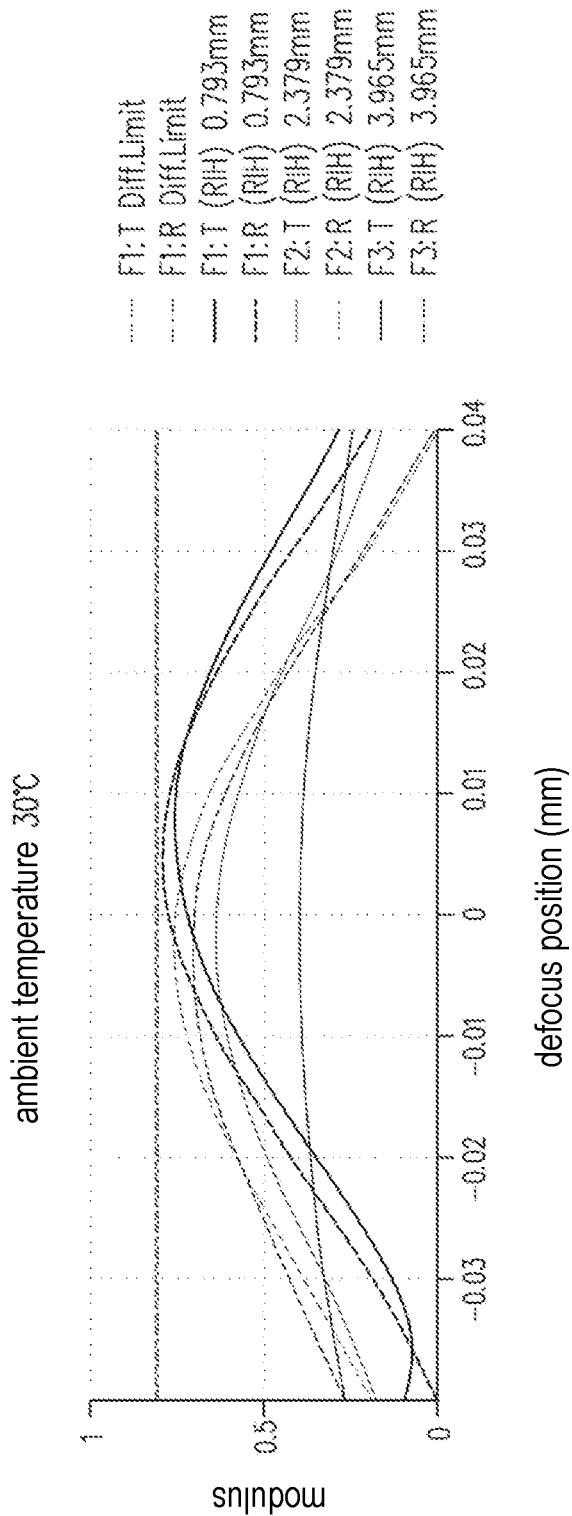
Figure 6J:
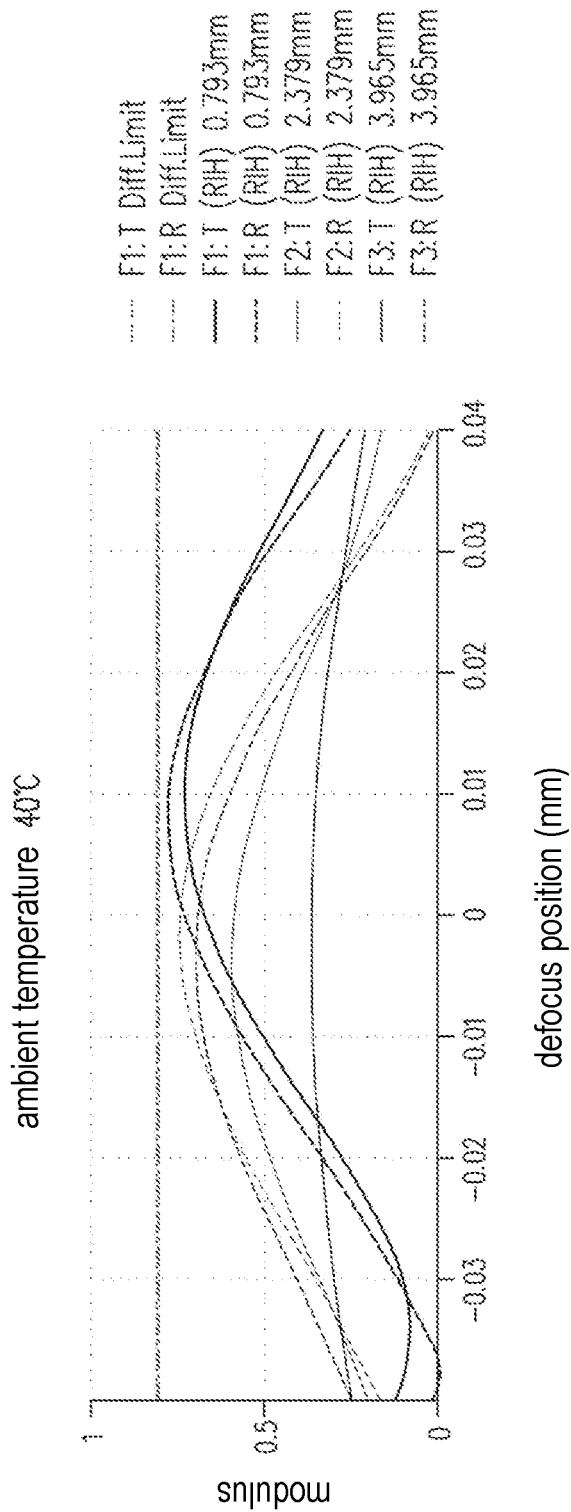

FIG. 6A is a lateral color aberration plot of the optical lens of FIG. 5. FIG. 6B depicts an astigmatism field curvature plot and a distortion plot of the optical lens of FIG. 5. FIG. 6C is a transverse ray fan plot of the optical lens of FIG. 5 and is a simulation data plot depicted based on wavelengths of 465 nm, 525 nm, and 620 nm. FIG. 6D is a modulation transfer function curve plot of the optical lens of FIG. 5, in which horizontal coordinates represent focus shifts, and vertical coordinates represent modulus of an optical transfer function (OTF). FIG. 6E is simulation data plot of wavefront optical path differences (OPD) at different image heights of the optical lens of FIG. 5. FIG. 6F to FIG. 6J are modulation transfer function curve plots of an optical lens of the optical lens of FIG. 5 under different temperatures.

The shapes illustrated in FIG. 6A to FIG. 6E are all within the standard range, it is thereby validated that the optical lens 110c of the embodiment achieves a good image effect. Note that in FIG. 6E, it can be known that on the active surface of the image generation device 150, the OPD range of the image beam IM is: −1.5λ<OPD<1.5λ, where OPD is an optical path difference among image heights, λ is a wavelength of each color light, and the image beam IM includes red light, green light, and blue light. The active surface AS of the image generation device 150 is a surface from which the image beam IM exits. Further, regarding the design of such optical path difference, a person of ordinary skill in the art may easily know that the optical path difference among image heights of the image beam required to be provided by the image source may be obtained through reverse deduction from an object plane by means of optical simulation when designing an optical lens. In the embodiment, the design of the optical lens 110c is complied with a predetermined specification, and the optical lens 110c may analyze images with a resolution of at least 931 p/mm, so that the optical lens 110c exhibits high resolution. Besides, it can be seen that the shapes shown from FIG. 6F to FIG. 6J are all within the standard range in different ambient temperatures (the ambient temperatures from FIG. 6F to FIG. 6J respectively are 0 degree, 10 degrees, 20 degrees, 30 degrees, and 40 degrees), it is thereby validated that the optical lens 110c of the embodiment exhibits good thermal stability.

In this embodiment, one of the scenarios is that the optical lens 110c of FIG. 5 satisfies 1<(A+C)/B<2.5, and definitions of other parameters A, B, C, D, E, and F are identical to that provided above. In the embodiment, the above parameters A, B, C, D, E, and F respectively are, for example 6.2 millimeters, 11.01 millimeters, 12 millimeters, 8.6 millimeters, 3.2 millimeters, 7.93 millimeter, and (A+C)/B is 1.653. Numerical values of these parameters are not intended to limit the invention. In this embodiment, the field of view of the optical lens 110c is 50 degrees.

Figure 7:
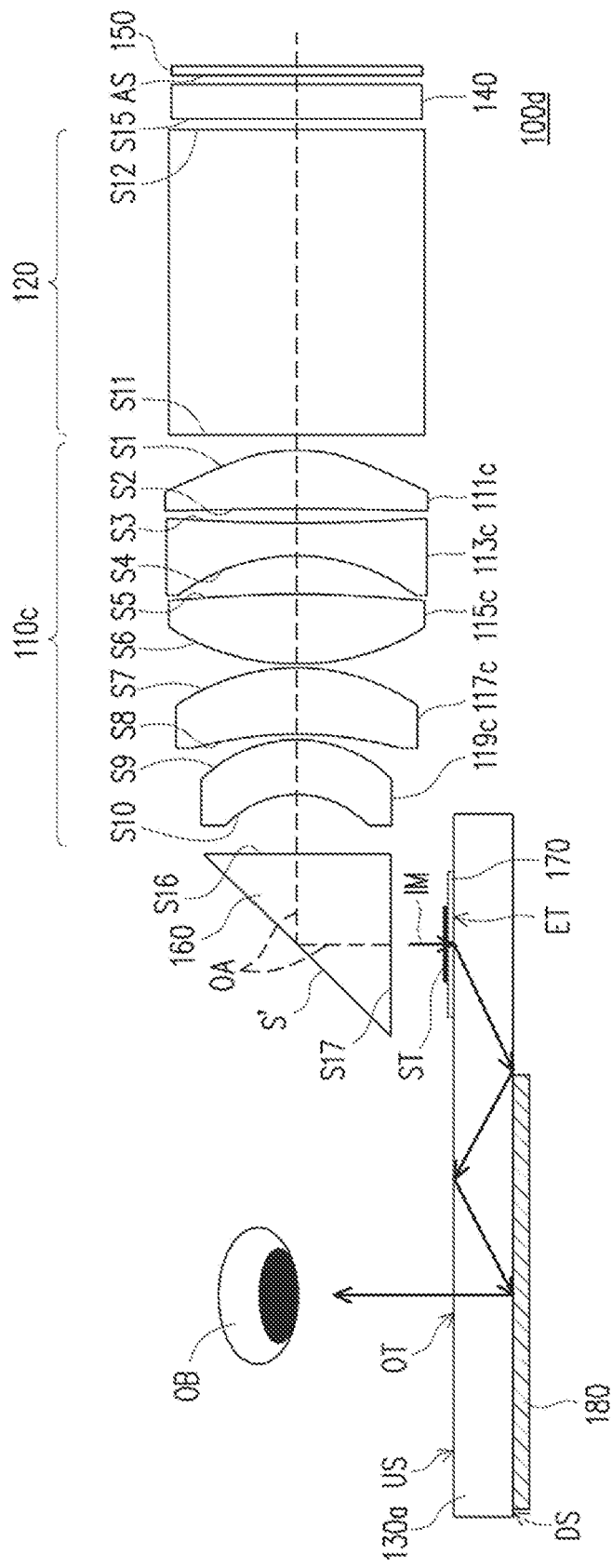
FIG. 7 is a schematic diagram of a waveguide display according to another embodiment of the invention.

FIG. 7 is a schematic diagram of a waveguide display according to another embodiment of the invention. With reference to FIG. 7, a waveguide display 100d of this embodiment is generally similar to the waveguide display 100a of FIG. 3, and a difference therebetween lies in that: the design adopted by the waveguide display 100d is similar to the design of the optical lens 110c as shown in FIG. 5.

An example of the optical lens 110c applied to the waveguide display 100d is provided as follows. Note that the invention is not limited to the data listed as follows. It should be known to a person of ordinary skill in the art that various modifications and variations can be made to the parameters or configurations of the invention with reference to the invention, and such modifications and variations still belong to the scope of the invention.

TABLE SEVEN

| Device | Surface | Radius of Curvature (mm) | Gap (mm) | Index of Refraction | Abbe Number | Optical Effective Radius (mm) |
|---|---|---|---|---|---|---|
| Object | | infinity | | | | |
| Stop ST | | infinity | 0.82 | | | 1.6 |
| Turning Prism 160 | S12 | infinity | 4.8 | 2.00 | 28.3 | 1.7 |
| | S13 | infinity | 1.49 | | | 2.3 |
| Fifth Lens | S10 | −3.17 | 1.74 | 1.53 | 55.7 | 2.4 |
| Element 119c | S9 | −4.54 | 0.15 | | | 3.1 |
| Fourth Lens | S8 | −14.03 | 2.19 | 1.83 | 42.7 | 3.5 |
| Element 117c | S7 | −6.86 | 0.1 | | | 3.9 |
| Third Lens | S6 | 7.64 | 2.29 | 1.53 | 55.7 | 4.1 |
| Element 115c | S5 | −20.74 | 1.17 | | | 4.0 |
| Second Lens | S4 | −5.30 | 1.07 | 1.64 | 22.4 | 4.0 |
| Element 113c | S3 | 20.13 | 0.39 | | | 4.2 |
| First Lens | S2 | −23.20 | 1.91 | 1.53 | 55.7 | 4.3 |
| Element 111c | S1 | −5.20 | 0.5 | | | 4.3 |

TABLE SEVEN-continued

| Device | Surface | Radius of Curvature (mm) | Gap (mm) | Index of Refraction | Abbe Number | Optical Effective Radius (mm) |
|---|---|---|---|---|---|---|
| Illumination Prism 120 | S11 | infinity | 9.8 | 1.83 | 42.7 | 4.2 |
|  | S12 | infinity | 0.3 |  |  | 4.0 |
| Glass Cover 140 | S15 |  |  |  |  |  |

In addition, since the surfaces and parameters of the lens elements 111c, 113c, 115c, 117c, and 119c of the optical lens 110c of FIG. 7 are designed to be identical to that of the optical lens 110c of FIG. 5, description thereof is not repeated herein.

In this embodiment, one of the scenarios is that the optical lens 110c of FIG. 7 satisfies 1<(A+C)/B<2.5, and definitions of other parameters A, B, C, D, E, and F are identical to that provided above. In the embodiment, the above parameters A, B, C, D, E, and F respectively are, for example 5.82 millimeters, 11.01 millimeters, 12 millimeters, 8.6 millimeters, 3.2 millimeters, 7.93 millimeter, and (A+C)/B is 1.62. Numerical values of these parameters are not intended to limit the invention. In this embodiment, the field of view of the optical lens 110c is 50 degrees.

Figure 8:
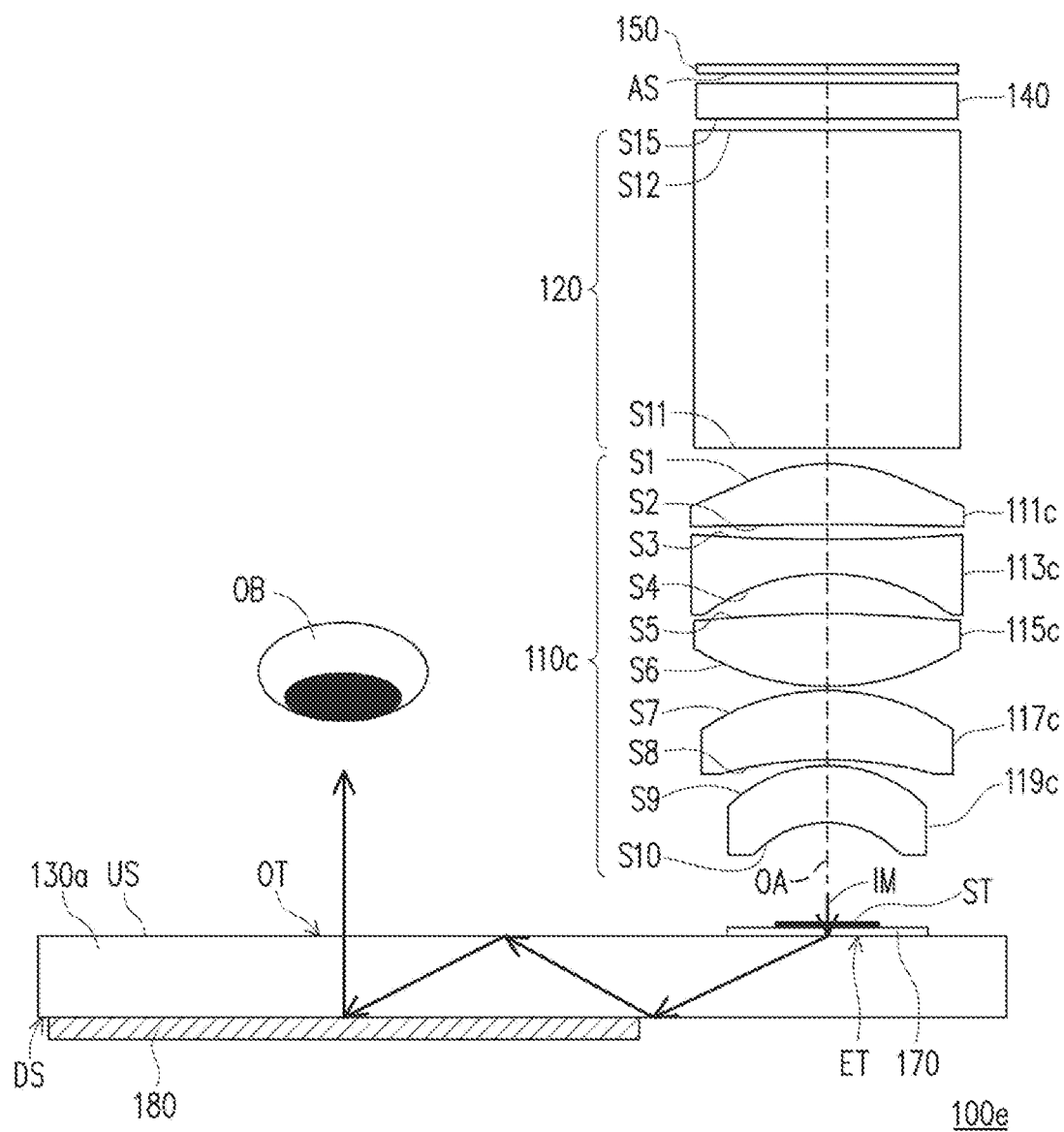
FIG. 8 is a schematic diagram of a waveguide display according to another embodiment of the invention.

FIG. 8 is a schematic diagram of a waveguide display according to another embodiment of the invention. With reference to FIG. 8, a waveguide display 100e of this embodiment is generally similar to the waveguide display 100b of FIG. 4, and a difference therebetween lies in that: the design adopted by the waveguide display 100e is similar to the design of the optical lens 110c as shown in FIG. 5.

An example of the optical lens 110e applied to the waveguide display 100e is provided as follows. Note that the invention is not limited to the data listed as follows. It should be known to a person of ordinary skill in the art that various modifications and variations can be made to the parameters or configurations of the invention with reference to the invention, and such modifications and variations still belong to the scope of the invention.

TABLE EIGHT

| Device | Surface | Radius of Curvature (mm) | Gap (mm) | Index of Refraction | Abbe Number | Optical Effective Radius (mm) |
|---|---|---|---|---|---|---|
| Object |  | infinity |  |  |  |  |
| Stop ST |  | infinity | 4.59 |  |  | 1.6 |
| Fifth Lens Element 119 | S10 | −3.17 | 1.74 | 1.53 | 55.7 | 2.4 |
|  | S9 | −4.54 | 0.15 |  |  | 3.1 |
| Fourth Lens Element 117 | S8 | −14.03 | 2.19 | 1.83 | 42.7 | 3.5 |
|  | S7 | −6.86 | 0.1 |  |  | 3.9 |
| Third Lens Element 115 | S6 | 7.64 | 2.29 | 1.53 | 55.7 | 4.1 |
|  | S5 | −20.74 | 1.17 |  |  | 4.0 |
| Second Lens Element 113 | S4 | −5.30 | 1.07 | 1.64 | 22.4 | 4.0 |
|  | S3 | 20.13 | 0.39 |  |  | 4.2 |
| First Lens Element 111 | S2 | −23.20 | 1.91 | 1.53 | 55.7 | 4.3 |
|  | S1 | −5.20 | 0.5 |  |  | 4.3 |
| Illumination Prism 120 | S11 | infinity | 9.8 | 1.83 | 42.7 | 4.2 |
|  | S12 | infinity | 0.3 |  |  | 4.0 |
| Glass Cover 140 | S15 |  |  |  |  |  |

In addition, since the surfaces and parameters of the lens elements 111c, 113c, 115c, 117c, and 119c of the optical lens 110c of FIG. 8 are designed to be identical to that of the optical lens 110c of FIG. 5, description thereof is not repeated herein.

In this embodiment, one of the scenarios is that the optical lens 110c of FIG. 8 satisfies 1<(A+C)/B<2.5, and definitions of other parameters A, B, C, D, E, and F are identical to that provided above. In the embodiment, the above parameters A, B, C, D, E, and F respectively are, for example 3.3 millimeters, 11.01 millimeters, 12 millimeters, 8.6 millimeters, 3.2 millimeters, 7.93 millimeter, and (A+C)/B is 1.39. Numerical values of these parameters are not intended to limit the invention. In this embodiment, the field of view of the optical lens 110c is 50 degrees.

Note that the optical lens 110c of FIG. 5, FIG. 7, and FIG. 8 includes a total of five lens elements, but the invention is not limited thereto. A diameter of the beam waist ST is approximately 3.2 mm, which is closes to the size of the pupil of an average human eye (approximately 3 mm to 6 mm). The image generation device 150 uses, for example, a 0.3-inch 720P DMD apparatus and has a diagonal of 7.93 mm. Moreover, the diagonal of the image generation device 150 represents the image circle of the optical lens 110. Under the design of the optical lens 110c provided herein, the human eye may see a virtual image equivalent to 73.7 inches 2 meters away, and the magnification at this time is substantially 236 times.

In addition, in the embodiment, a relation formula between the focal length and the image height of the optical lens 110c is as follows: image height=focal length×tan (half field of view). Herein, the image height is, for example, 3.965 mm, and if the field of view is designed to be 50 degrees, the half field of view is 25 degrees, so that an effective focal length of the optical lens 110c is approximately 8.5 mm. Besides, the optical lens 110c of FIG. 5 to FIG. 8 satisfies 1<|f5/f4|<15 and V5−V4<25, where f4 is a focal length of the fourth lens element 117c of the optical lens 110c, f5 is a focal length of the fifth lens element 119c of the optical lens 110c, V4 is an Abbe number of the fourth lens element 117c, and V5 is an Abbe number of the fifth lens element 119c. In the embodiment, the above parameters f4, f5, V4, and V5 respectively are, for example, 13.99 millimeters, −35.2 millimeters, 43, and 56, and f5/f4 is −2.52 and V5−V4 is 13. Numerical values of these parameters are not intended to limit the invention.

In view of the foregoing, the embodiments of the invention have at least one of the following advantages or effects. In the exemplary embodiments of the invention, the optical lens is designed to be compliant with the predetermined specification, so that the optical lens features a small size, light weight, large angle of view, and high resolution. Further, the fourth lens element of the optical lens is made of glass, so that the optical lens may exhibit almost no thermal drift and therefore features good thermal stability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical lens, wherein the optical lens consists of: a first lens element, a second lens element, a third lens element, a fourth lens element, and a fifth lens element sequentially arranged from a light incident side to a light exit side,
   wherein refracting powers of the first lens element to the fourth lens element sequentially are positive, negative, positive, and positive, and the fifth lens element has refracting power,
   wherein the first lens element is a concave-convex lens element and has a convex surface facing the light incident side, and the second lens element is a biconcave lens element,
   wherein an image generation device is disposed at the light incident side, the optical lens is configured to receive an image beam provided by the image generation device, the image beam forms a beam waist at the light exit side, and the beam waist has a minimum cross-sectional area of beam shrinkage of the image beam.

2. The optical lens according to claim 1, wherein the optical lens further satisfies the following conditional expression:

$1<(A+C)/B<2.5$, wherein A is a distance from the beam waist to a lens barrel in which the optical lens is installed, B is a total lens length of the optical lens, and C is distance from a surface of the first lens facing the light incident side to the image generation device on an optical axis.

3. The optical lens according to claim 1, wherein the optical lens further satisfies the following conditional expression:

$1<|f5/f4|<15$, wherein f4 is a focal length of the fourth lens element of the optical lens, and f5 is a focal length of the fifth lens element of the optical lens.

4. The optical lens according to claim 1, wherein the optical lens further satisfies the following conditional expression:

$V5-V4<25$, wherein V4 is an Abbe number of the fourth lens element, and V5 is an Abbe number of the fifth lens element.

5. The optical lens according to claim 1, wherein a material of the first lens element, the second lens element, and third lens element, and the fifth lens element is a plastic material, and a material of the fourth lens element is glass.

6. The optical lens according to claim 1, wherein a material of the fourth lens element is glass, and an equivalent focal length of the fourth lens element is greater than 0.

7. The optical lens according to claim 1, wherein the refracting power of the fifth lens element is positive.

8. The optical lens according to claim 1, wherein the refracting power of the fifth lens element is negative.

9. The optical lens according to claim 1, wherein a size of a virtual image projected through the optical lens is 184 times a size of the image generation device, and a field of view of the optical lens is 40 degrees.

10. The optical lens according to claim 1, wherein a size of a virtual image projected through the optical lens is 236 times a size of the image generation device, and a field of view of the optical lens is 50 degrees.

11. The optical lens according to claim 1, wherein the first lens element, the second lens element, the third lens element, and the fifth lens element are aspheric lens elements, and the fourth lens element is a spherical lens element.

12. A waveguide display comprising the optical lens according to claim 1 and a first prism, wherein the first prism is disposed between the optical lens and the beam waist, the image beam leaves the optical lens, passes through the first prism, and converges on the beam waist, and the image beam diverges after passing through the beam waist.

13. A waveguide display comprising the optical lens according to claim 1 and a waveguide device, wherein the waveguide device has an optical coupling entrance and an optical coupling exit respectively located on two different surface regions of the waveguide device, the image beam enters the waveguide device through the optical coupling entrance, and the waveguide device is configured to guide the image beam, so that the image beam leaves the waveguide device through the optical coupling exit and then is projected to a target.

14. The waveguide display according to claim 13, wherein the beam waist is formed at the optical coupling entrance, the optical coupling exit of the waveguide device, or a position between the optical coupling entrance and the optical coupling exit.

15. An optical lens, wherein the optical lens comprises: a first lens element, a second lens element, a third lens element, a fourth lens element, and a fifth lens element sequentially arranged from a light incident side to a light exit side,
   wherein refracting powers of the first lens element to the fourth lens element sequentially are positive, negative, positive, and positive, and the fifth lens element has refracting power, wherein
   the first lens element is a concave-convex lens element and has a convex surface facing the light incident side,
   the second lens element is a biconcave lens element,
   the third lens element is a concave-convex lens element and has a convex surface facing the light exit side,
   the fourth lens element is a biconvex lens element, and the fifth lens element is a concave-convex lens element and has a convex surface facing the light incident side, wherein an image generation device is disposed at the light incident side, the optical lens is configured to receive an image beam provided by the image generation device, the image beam forms a beam waist at the light exit side, and the beam waist has a minimum cross-sectional area of beam shrinkage of the image beam.

16. An optical lens, wherein the optical lens comprises: a first lens element, a second lens element, a third lens element, a fourth lens element, and a fifth lens element sequentially arranged from a light incident side to a light exit side, wherein refracting powers of the first lens element to the fourth lens element sequentially are positive, negative, positive, and positive, and the fifth lens element has refracting power, wherein the first lens element is a concave-convex lens element and has a convex surface facing the light incident side, the second lens element is a biconcave lens element, the third lens element is a biconvex lens element, the fourth lens element is a biconvex lens element, and the fifth lens element is a concave-convex lens element and has a convex surface facing the light incident side, wherein an image generation device is disposed at the light incident side, the optical lens is configured to receive an image beam provided by the image generation device, the image beam forms a beam waist at the light exit side, and the beam waist has a minimum cross-sectional area of beam shrinkage of the image beam.

* * * * *